US011615788B2

(12) United States Patent
Oh et al.

(10) Patent No.: US 11,615,788 B2
(45) Date of Patent: Mar. 28, 2023

(54) METHOD FOR EXECUTING FUNCTION BASED ON VOICE AND ELECTRONIC DEVICE SUPPORTING THE SAME

(71) Applicant: Samsung Electronics Co., Ltd., Suwon-si (KR)

(72) Inventors: Saeah Oh, Suwon-si (KR); Kyoungsoo Yoon, Suwon-si (KR); Hankyung Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/536,257

(22) Filed: Aug. 8, 2019

(65) Prior Publication Data

US 2020/0051563 A1 Feb. 13, 2020

(30) Foreign Application Priority Data

Aug. 8, 2018 (KR) .................. 10-2018-0092665

(51) Int. Cl.
  *G10L 15/22* (2006.01)
  *G10L 15/26* (2006.01)
  *G06F 3/16* (2006.01)

(52) U.S. Cl.
  CPC .............. *G10L 15/22* (2013.01); *G06F 3/167* (2013.01); *G10L 2015/223* (2013.01)

(58) Field of Classification Search
  CPC . G06F 3/167; G06F 2203/0381; G10L 15/22; G10L 15/26; G10L 2015/221; G10L 2015/225; H04M 3/4936
  USPC ................... 704/231, 235, 246, 251
  See application file for complete search history.

(56) References Cited

U.S. PATENT DOCUMENTS

| 2014/0082501 | A1 | 3/2014 | Bae et al. |
| 2014/0095176 | A1 | 4/2014 | Kim et al. |
| 2014/0223438 | A1 | 8/2014 | Yun et al. |
| 2016/0095176 | A1 | 3/2016 | Chang Hu |
| 2016/0118048 | A1* | 4/2016 | Heide ..................... G10L 15/22 704/275 |
| 2016/0132030 | A1 | 5/2016 | Marti et al. |

(Continued)

FOREIGN PATENT DOCUMENTS

| CN | 103369492 A | 10/2013 |
| CN | 103677261 A | 3/2014 |

(Continued)

OTHER PUBLICATIONS

Communication pursuant to Article 94(3) EPC dated Feb. 4, 2021 in connection with European Application No. 19190780.7, 6 pages.

(Continued)

*Primary Examiner* — George C Monikang

(57) ABSTRACT

An electronic device includes a microphone, a display, and a processor configured to obtain a voice input through the microphone; identify whether the voice input corresponds to an instruction that is set to execute at least one function regarding at least one command; in response to it being identified that the voice input corresponds to the set instruction, perform an action for executing the at least one function; through the display, display at least one object for controlling the action for executing the at least one function; and, in response to a user input on the at least one object, control the action for executing the at least one function.

19 Claims, 21 Drawing Sheets

(56) References Cited

U.S. PATENT DOCUMENTS

| | | |
|---|---|---|
| 2016/0155442 A1 | 6/2016 | Kannan et al. |
| 2017/0031652 A1 | 2/2017 | Kam et al. |
| 2018/0096681 A1 | 4/2018 | Ni et al. |
| 2018/0173403 A1 | 6/2018 | Carbune et al. |

FOREIGN PATENT DOCUMENTS

| | | |
|---|---|---|
| CN | 105679315 A | 6/2016 |
| CN | 106098061 A | 11/2016 |
| CN | 107004413 A | 8/2017 |
| EP | 2763031 A1 | 8/2014 |
| KR | 10-2010-0058318 A | 6/2010 |
| KR | 10-2014-0009687 A | 1/2014 |
| KR | 10-2014-0039961 A | 4/2014 |
| KR | 10-2016-0044652 A | 4/2016 |
| KR | 10-2017-0014353 A | 2/2017 |
| KR | 10-2017-0092550 A | 8/2017 |
| KR | 10-2018-0046208 A | 5/2018 |

OTHER PUBLICATIONS

International Search Report dated Dec. 9, 2019 in connection with International Patent Application No. PCT/KR2019/010025, 3 pages.
Written Opinion of the International Searching Authority dated Dec. 9, 2019 in connection with International Patent Application No. PCT/KR2019/010025, 5 pages.
European Search Report dated Dec. 20, 2019 in connection with European Patent Application No. 19 19 0780, 8 pages.
Notification of the First Office Action dated May 26, 2021, in connection with Chinese Patent Application No. 201980052141.9, 21 pages.
Notification of the Second Office Action dated Dec. 14, 2021, in connection with Chinese Application No. 201980052141.9, 21 pages.
Examination report dated Jan. 27, 2022, in connection with Indian Application No. 202117009136, 6 pages.
China National Intellectual Property Administration, "Notification of the Third Office Action," dated Apr. 13, 2022, in connection with Chinese Patent Application No. 201980052141.9, 20 pages.
Decision on Rejection dated Aug. 11, 2022 in connection with Chinese Patent Application No. 201980052141.9, 11 pages.
Notice of Preliminary Rejection dated Jul. 19, 2022 in connection with Korean Patent Application No. 10-2018-0092665, 13 pages.

\* cited by examiner

METHOD FOR EXECUTING FUNCTION BASED ON VOICE AND ELECTRONIC DEVICE SUPPORTING THE SAME

CROSS-REFERENCE TO RELATED APPLICATIONS

This application is based on and claims priority under 35 U.S.C. § 119 to Korean Patent Application No. 10-2018-0092665 filed on Aug. 8, 2018 in the Korean Intellectual Property Office, the disclosure of which is herein incorporated by reference in its entirety.

BACKGROUND

1. Field

The disclosure relates to a method for executing a function based on a voice and an electronic device supporting the same.

2. Description of Related Art

As electronic devices complexly performing various functions, such as smartphones, are developing in recent years, electronic devices having a voice recognition function mounted therein to enhance operability are being released. The voice recognition function enables an electronic device to easily execute various functions by recognizing a voice of a user without operating an extra button or touching a touch module.

The above information is presented as background information only to assist with an understanding of the disclosure. No determination has been made, and no assertion is made, as to whether any of the above might be applicable as prior art with regard to the disclosure.

SUMMARY

When a voice inputted from a user corresponds to a designated instruction, an electronic device provided with a voice recognition function may perform a function of executing at least one function regarding at least one command set for the designated instruction in sequence.

The electronic device may not control the action for executing the at least one function regarding the at least one command set for the designated instruction while executing the at least one function regarding the at least one command set for the designated instruction in sequence.

Various embodiments of the disclosure relate to a method for executing a function based on a voice, which can perform a voice recognition function more exactly by controlling an action for executing a function regarding a command set for a designated instruction by using at least one object, while executing at least one function regarding at least one command set for the designated instruction, and an electronic device supporting the same.

The technical objects to be achieved by the disclosure are not limited to those mentioned above, and other technical objects that are not mentioned above may be clearly understood to those skilled in the art based on the description provided below.

An electronic device according to various embodiments of the disclosure includes a microphone, a display, and a processor, and the processor is configured to: obtain a voice input through the microphone; identify whether the voice input corresponds to an instruction that is set to execute at least one function regarding at least one command; in response to it being identified that the voice input corresponds to the set instruction, perform an action for executing the at least one function; through the display, display at least one object for controlling the action for executing the at least one function; and, in response to a user input on the at least one object, control the action for executing the at least one function.

A method according to various embodiments of the disclosure includes: obtaining a voice input through a microphone; identifying whether the voice input corresponds to an instruction that is set to execute at least one function regarding at least one command; in response to it being identified that the voice input corresponds to the set instruction, performing an action for executing the at least one function; through a display, displaying at least one object for controlling the action for executing the at least one function; and, in response to a user input on the at least one object, controlling the action for executing the at least one function.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
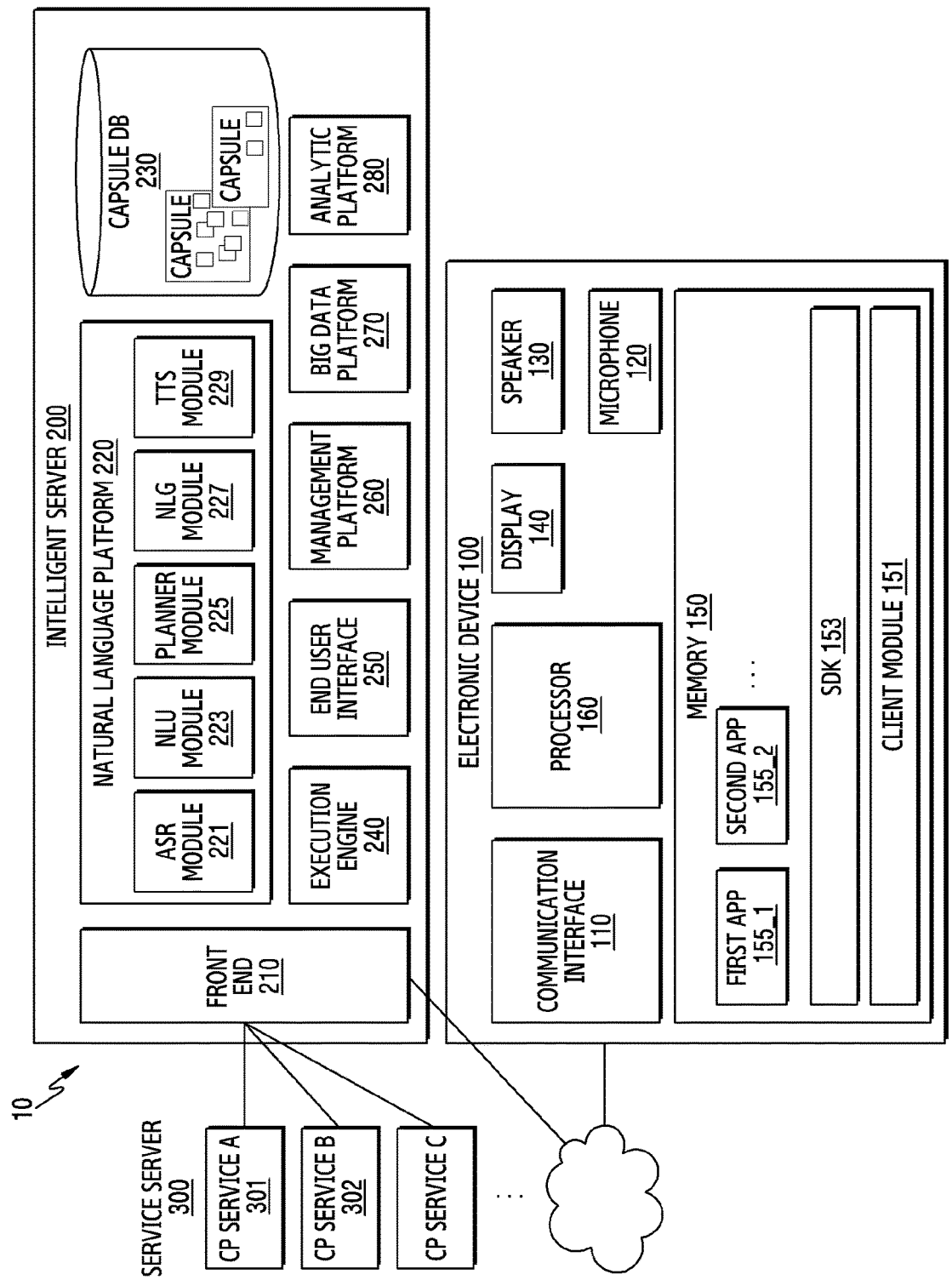
FIG. 1 is a block diagram illustrating an integrated intelligence system according to various embodiments.

FIG. 1 is a block diagram illustrating an integrated intelligence system according to various embodiments.

Referring to FIG. 1, the integrated intelligence system 10 according to an embodiment may include an electronic device 100, an intelligent server 200, a service server 300.

The electronic device 100 according to an embodiment may be a terminal device (or an electronic device) which is connectable to the Internet, and may be, for example, a mobile phone, a smartphone, a personal digital assistant (PDA), a laptop computer, a television (TV), a home appliance, a wearable device, a head-mounted device (HMD), or a smart speaker.

According to the embodiment illustrated, the electronic device 100 may include a communication interface 110, a microphone 120, a speaker 130, a display 140, a memory 150, or a processor 160. The elements listed above may be operatively or electrically connected with one another.

The communication interface 110 according to an embodiment may be configured to be connected with an external device to exchange data therewith. The microphone 120 according to an embodiment may receive a sound (for example, user utterance) and may convert the sound into an electric signal. The speaker 130 according to an embodiment may output the electric signal as a sound (for example, a voice). The display 140 according to an embodiment may be configured to display an image or a video. The display 140 according to an embodiment may also display a graphic user interface (GUI) of a running app (or application program).

The memory 150 according to an embodiment may store a client module 151, a software development kit (SDK) 153, and a plurality of apps 155. The client module 151 and the SDK 153 may constitute a framework (or a solution program) for performing generic-purpose functions. In addition, the client module 151 or the SDK 153 may constitute a framework for processing a voice input.

The plurality of apps 155 of the memory 150 according an embodiment may be programs for performing designated functions. According to an embodiment, the plurality of apps 155 may include a first app 155_1 and a second app 155_2.

According to an embodiment, each of the plurality of apps 155 may include a plurality of actions for performing a designated function. For example, the apps may include an alarm app, a message app, and/or a schedule app. According to an embodiment, the plurality of apps 155 may be executed by the processor 160 to execute at least a part of the plurality of actions in sequence.

The processor 160 according to an embodiment may control overall actions of the electronic device 100. For example, the processor 160 may be electrically connected with the communication interface 110, the microphone 120, the speaker 130, and the display 140 to perform designated actions.

The processor 160 according to an embodiment may perform a designated function by executing a program stored in the memory 150. For example, the processor 160 may perform the following actions for processing a voice input by executing at least one of the client module 151 or the SDK 153. The processor 160 may control the actions of the plurality of apps 155 through the SDK 153. The following actions described as actions of the client module 151 or the SDK 153 may be actions by execution of the processor 160.

The client module 151 according to an embodiment may receive a voice input. For example, the client module 151 may receive a voice signal corresponding to user utterance detected through the microphone 120. The client module 151 may transmit the received voice input to the intelligent server 200. The client module 151 may transmit state information of the electronic device 100 to the intelligent server 200 along with the received voice input. The state information may be, for example, execution state information of an app.

The client module 151 according to an embodiment may receive a result corresponding to the received voice input. For example, when the result corresponding to the received voice input can be calculated at the intelligent server 200, the client module 151 may receive the result corresponding to the received voice input. The client module 151 may display the received result on the display 140.

The client module 151 according to an embodiment may receive a plan corresponding to the received voice input. The client module 151 may display results of executing the plurality of actions of the app according to the plan on the display 140. The client module 151 may display the results of executing the plurality of actions on the display in sequence. In another example, the electronic device 100 may display only a part of the results of executing the plurality of actions (for example, a result of the final action) on the display.

According to an embodiment, the client module 151 may receive, from the intelligent server 200, a request for obtaining information necessary for calculating the result corresponding to the voice input. According to an embodiment, the client module 151 may transmit the necessary information to the intelligent server 200 in response to the request.

The client module 151 according to an embodiment may transmit information of the results of executing the plurality of actions according to the plan to the intelligent server 200. The intelligent server 200 may identify that the received voice input is correctly processed by using the result information.

The client module 151 according to an embodiment may include a voice recognition module. According to an embodiment, the client module 151 may recognize a voice input performing a restricted function through the voice recognition module. For example, the client module 151 may perform an intelligent app for processing a voice input for executing a systematic action through a designated input (for example, Wake up!).

The intelligent server 200 according to an embodiment may receive information related to a user voice input from the electronic device 100 via a communication network. According to an embodiment, the intelligent server 200 may change data related to the received voice input to text data. According to an embodiment, the intelligent server 200 may generate a plan for executing a task corresponding to the user voice input, based on the text data.

According to an embodiment, the plan may be generated by an artificial intelligent (AI) system. The AI system may be a rule-based system, or a neural network-based system (for example, a feedforward neural network (FNN), a recurrent neural network (RNN)). Alternatively, the AI system may be a combination of the above-mentioned systems or other AI systems. According to an embodiment, the plan may be selected from a set of pre-defined plans, or may be generated in real time in response to a user request. For example, the AI system may select at least one plan from the plurality of pre-defined plans.

The intelligent server 200 according to an embodiment may transmit a result according to the generated plan to the electronic device 100, or may transmit the generated plan to the electronic device 100. According to an embodiment, the electronic device 100 may display the result according to the plan on the display. According to an embodiment, the electronic device 100 may display a result of executing an action according to the plan on the display.

The intelligent server 200 according to an embodiment may include a front end 210, a natural language platform 220, a capsule database (DB) 230, an execution engine 240, an end user interface 250, a management platform 260, a big data platform 270, or an analytic platform 280.

The front end 210 according to an embodiment may receive a voice input received from the electronic device 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech (TTS) module 229.

The ASR module 221 according to an embodiment may convert the voice input received from the electronic device 100 into text data. The NLU module 223 according to an embodiment may understand a user's intent by using the text data of the voice input. For example, the NLU module 223 may understand the user's intent by performing syntactic analysis or semantic analysis. The NLU module 223 according to an embodiment may understand a meaning of a word extracted from the voice input by using linguistic characteristics (for example, grammatical elements) of a morpheme or a phrase, and may determine the user's intent by matching the understood word meaning with an intent.

The planner module 225 according to an embodiment may generate a plan by using the intent determined at the NLU module 223 and a parameter. According to an embodiment, the planner module 225 may determine a plurality of domains necessary for performing a task based on the determined intent. The planner module 225 may determine a plurality of actions included in each of the plurality of domains determined based on the intent. According to an embodiment, the planner module 225 may determine parameters necessary for executing the determined plurality of actions, or result values outputted by execution of the plurality of actions. The parameter and the result value may be defined as a concept of a designated form (or class). Accordingly, the plan may include the plurality of actions determined by the user's intent, and a plurality of concepts. The planner module 225 may determine relationships between the plurality of actions and the plurality of concepts in a step-wise manner (or hierarchically). For example, the planner module 225 may determine the order of executing the plurality of actions which are determined based on the user's intent, based on the plurality of concepts. In other words, the planner module 225 may determine the order of executing the plurality of actions, based on the parameters necessary for executing the plurality of actions, and results outputted by execution of the plurality of actions. Accordingly, the planner module 225 may generate a plan including association information (for example, ontology) between the plurality of actions and the plurality of concepts. The planner module 225 may generate the plan by using information stored in the capsule DB 230 in which a set of relationships between the concepts and the actions is stored.

The NLG module 227 according to an embodiment may change designated information into a text form. The information changed to the text form may be a form of natural language utterance. The TTS module 229 according to an embodiment may change information in a text form to information in a voice form.

The capsule DB 230 may store information regarding the relationships between the plurality of concepts and the plurality of actions corresponding the plurality of domains. A capsule according to an embodiment may include a plurality of action objects (or action information) and a plurality of concept objects (or concept information) which are included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry in which strategy information necessary for determining a plan corresponding to a voice input is stored. When there are a plurality of plans corresponding to a voice input, the strategy information may include reference information for determining one plan. According to an embodiment, the capsule DB 230 may include a follow-up registry in which information regarding a follow-up action for suggesting a follow-up action to a user in a designated context is stored. The follow-up action may include, for example, follow-up utterance. According to an embodiment, the capsule DB 230 may include a layout registry in which layout information of information outputted through the electronic device 100 is stored. According to an embodiment, the capsule DB 230 may include a vocabulary registry in which vocabulary information included in capsule information is stored. According to an embodiment, the capsule DB 230 may include a dialog registry in which information of a dialog (or interaction) with the user is stored. The capsule DB 230 may update stored objects through a developer tool. The developer tool may include, for example, a function editor for updating the action objects or the concept objects. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for activating a follow-up goal and editing follow-up utterance providing a hint. The follow-up goal may be determined based on a currently set goal, user's preference, or an environmental condition. The capsule DB 230 according to an embodiment may be implemented within the electronic device 100.

The execution engine 240 according to an embodiment may calculate a result by using the generated plan. The end user interface 250 may transmit the calculated result to the electronic device 100. Accordingly, the electronic device 100 may receive the result and provide the received result to the user. The management platform 260 according to an embodiment may manage information used in the intelligent server 200. The big data platform 270 according to an embodiment may collect data of the user. The analytic platform 280 according to an embodiment may manage a quality of service (QoS) of the intelligent server 200. For example, the analytic platform 280 may manage the elements and a processing rate (or efficiency) of the intelligent server 200.

The service server 300 according to an embodiment may provide a designated service (for example, a food ordering or hotel booking service) to the electronic device 100. According to an embodiment, the service server 300 may be a server that is managed by a third party. The service server 300 can include a variety of services, including CP service A 301, CP service B 302, and CP service C. The service server 300 according to an embodiment may provide information for generating the plan corresponding to the received voice input to the intelligent server 200. The provided information may be stored in the capsule DB 230. In addition, the service server 300 may provide result information according to the plan to the intelligent server 200.

In the integrated intelligence system 10 described above, the electronic device 100 may provide various intelligent services to the user in response to a user input. The user input may include, for example, an input through a physical button, a touch input, or a voice input.

In an embodiment, the electronic device 100 may provide a voice recognition service through an intelligent app (or a voice recognition app) stored therein. In this case, the electronic device 100 may recognize user utterance or a voice input received through the microphone, and may provide a service corresponding to the recognized voice input to the user.

In an embodiment, the electronic device 100 may perform a designated action independently or along with the intelligent server and/or service server, based on the received voice input. For example, the electronic device 100 may execute an app corresponding to the received voice input, and may perform the designated action through the executed app.

In an embodiment, when the electronic device 100 provides the service along with the intelligent server 200 and/or the service server, the electronic device may detect user utterance by using the microphone 120, and may generate a signal (or voice data) corresponding to the detected user utterance. The electronic device may transmit the voice data to the intelligent server 200 by using the communication interface 110.

The intelligent server 200 according to an embodiment may generate a plan for performing a task corresponding to the voice input, or a result of executing an action according to the plan, in response to the voice input received from the electronic device 100. The plan may include, for example, a plurality of actions for performing the task corresponding to the voice input of the user, and a plurality of concepts related to the plurality of actions. The concept may be a definition of a parameter inputted to execute the plurality of actions, or a definition of a result value outputted by execution of the plurality of actions. The plan may include association information between the plurality of actions and the plurality of concepts.

The electronic device 100 according to an embodiment may receive the response by using the communication interface 110. The electronic device 100 may output a voice signal generated in the electronic device 100 to the outside by using the speaker 130, or may output an image generated in the electronic device 100 to the outside by using the display 140.

Figure 2:
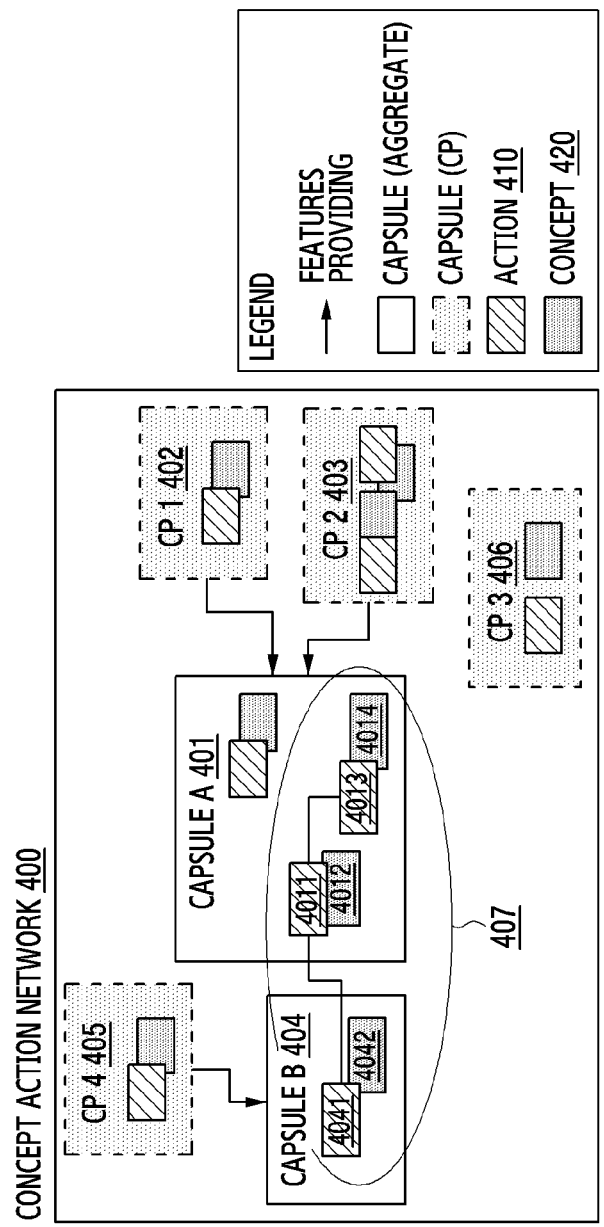
FIG. 2 is a view illustrating relationship information between concepts and actions stored in a database according to various embodiments.

FIG. 2 is a view illustrating relationship information between concepts and actions stored in a database according to various embodiments.

A capsule DB (for example, the capsule DB 230) of the intelligent server 200 may store capsules in the form of a concept action network (CAN) 400. The capsule DB may store an action for processing a task corresponding to a voice input of a user, and a parameter necessary for the action in the form of the CAN.

The capsule DB may store a plurality of capsules (capsule A 401, capsule B 404) corresponding to a plurality of domains (for example, applications), respectively. According to an embodiment, one capsule (for example, capsule A 401) may correspond to one domain (for example, a location (geo), an application). Alternatively, one capsule may correspond to at least one service provider (for example, CP 1 402, CP 2 403, CP 3 406, or CP 4 405) for performing a function regarding the domain related to the capsule. According to an embodiment, one capsule may include at least one action 410 and at least one concept 420 for performing a designated function.

The natural language platform 220 may generate a plan for performing a task corresponding to a received voice input by using a capsule stored in the capsule DB. For example, the planner module 225 of the natural language platform may generate a plan by using a capsule stored in the capsule DB. For example, a plan 407 may be generated by using actions 4011, 4013 and concepts 4012, 4014 of the capsule A 410, and an action 4041 and a concept 4042 of the capsule B 404.

Figure 3:
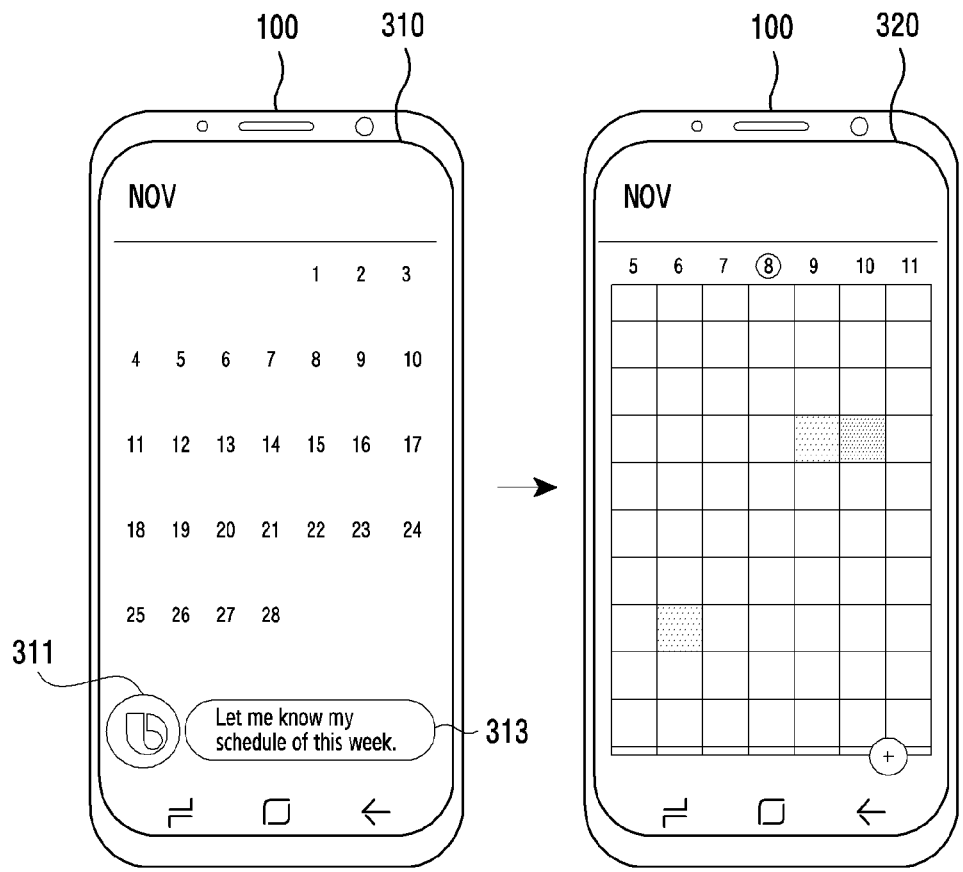
FIG. 3 is a view illustrating an electronic device which displays a screen for processing a voice input received through an intelligent app according to various embodiments.

FIG. 3 is a view illustrating a screen for processing a voice input received through an intelligent app in an electronic device according to various embodiments.

The electronic device 100 may execute an intelligent app to process a user input through the intelligent server 200.

According to an embodiment, when the electronic device 100 recognizes a designated voice input (for example, Wake up!) or receives an input through a hardware key (for example, a dedicated hardware key) on a screen 310, the electronic device 100 may execute the intelligent app to process the voice input. For example, the electronic device 100 may execute the intelligent app with a schedule app being executed. According to an embodiment, the electronic device 100 may display an object (for example, an icon) 311 corresponding to the intelligence app on the display 140. According to an embodiment, the electronic device 100 may receive a voice input by user utterance. For example, the electronic device 100 may receive a voice input saying "Let me know my schedule of this week!" According to an embodiment, the electronic device 100 may display a user interface (UI) 313 (for example, an input window) of the intelligent app displaying text data of the received voice input on the display.

According to an embodiment, the electronic device 100 may display a result corresponding to the received voice input in a screen 320 on the display. For example, the electronic device 100 may receive a plan corresponding to the received user input and may display "schedule of this week" on the display according to the plan.

Figure 4:
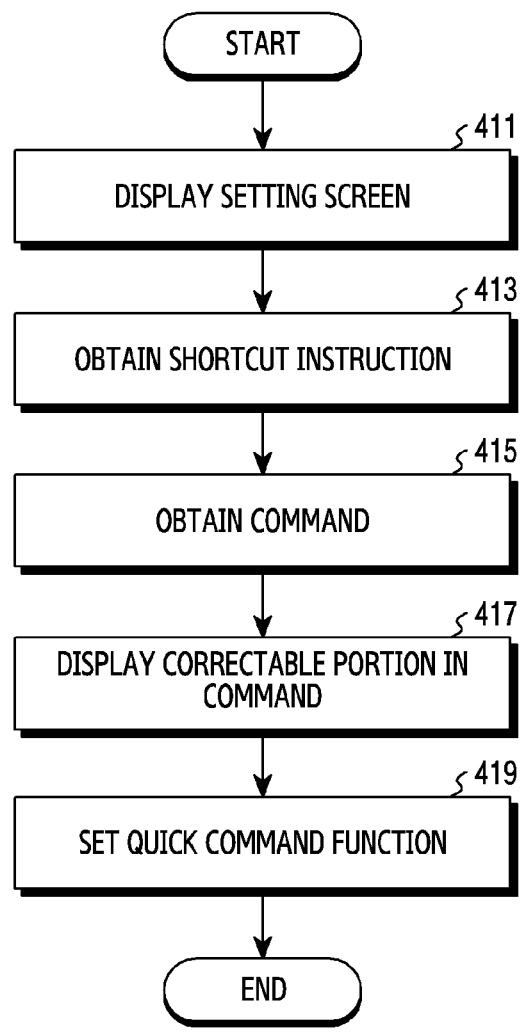
FIG. 4 is a flowchart illustrating a method for setting a quick command function according to various embodiments.

FIG. 4 is a flowchart illustrating a method for setting a quick command function according to an embodiment.

Referring to FIG. 4, in operation 411, the processor 160 may display a screen for setting a quick command through the display 140.

In an embodiment, the quick command function may be a function that, when a voice inputted from a user corresponds to a designated instruction (or command or text), executes at least one function regarding at least one command set for the designated instruction (or at least one function executed according to at least one command). For example, the processor 160 may set "morning" as a designated instruction by setting the quick command function. When "morning" is obtained from the user as a voice input, the electronic device 100 may not perform a function regarding (or corresponding to) "morning" as a command (or a normal voice command function regarding "morning" as a command), and may execute at least one function regarding at least one command set to correspond to (or mapped onto) "morning."

Hereinafter, a designated instruction to execute at least one function regarding at least one command by using the quick command function will be referred to as a "shortcut instruction."

In an embodiment, the processor 160 may display the screen for setting the quick command function through the display 140 in response to a user input for setting the quick command function.

Figure 7:
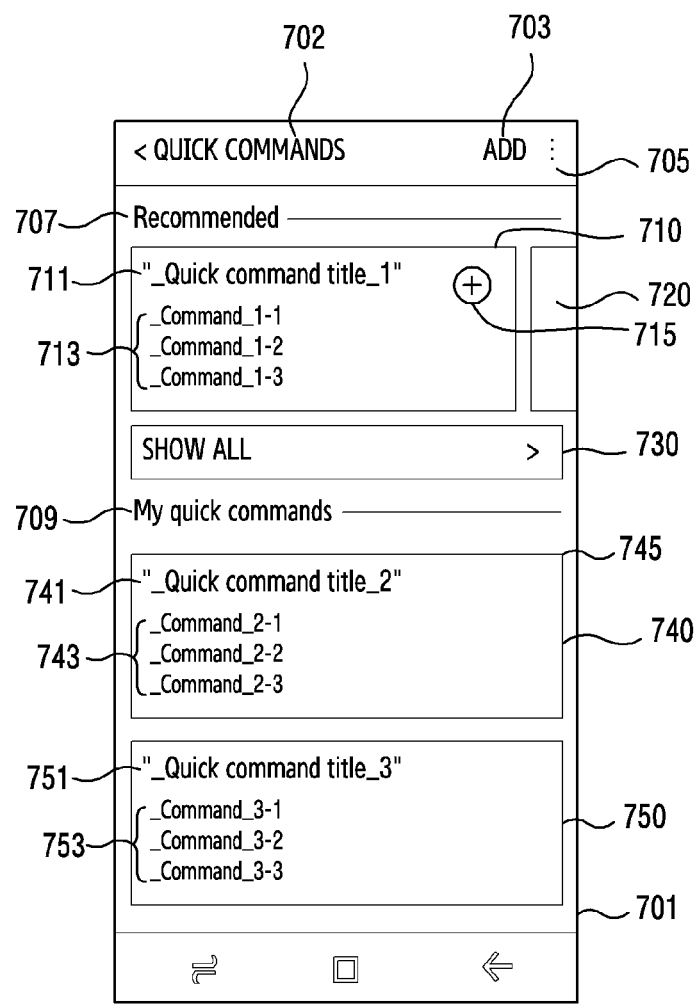
FIG. 7 is a view illustrating a method for setting a quick command function according to various embodiments.

In an embodiment, the processor 160 may display a default screen for setting the quick command function like a screen 701 of FIG. 7 through the display 140, in response to the user input for setting the quick command function.

In operation 413, the processor 160 in an embodiment may obtain (or input) a shortcut instruction.

In an embodiment, the processor 160 may obtain a shortcut instruction based on a text inputted by using a keyboard (or a virtual keyboard). For example, when the processor 160 receives a user input regarding a field 811 on a screen 801 of FIG. 8, the processor 160 may display a keyboard for inputting a text through the display 140. When a text is inputted through the keyboard, the processor 160 may obtain the inputted text as a shortcut instruction.

In an embodiment, the processor 160 may obtain the shortcut instruction based on a voice inputted from the user. For example, when the processor 160 receives a user input on an object 813 on the screen 801, the processor 160 may display a screen for receiving an input of a voice from the user through the display 140. The processor 160 may convert the voice inputted from the user into a text by using the voice recognition module, and may obtain the converted text as a shortcut instruction.

In an embodiment, the shortcut instruction may be at least one text that constitutes a word or phrase. However, this should not be considered as limiting. For example, the shortcut instruction may be at least one text constituting a symbol, a special character, or a sentence.

In operation 415, the processor 160 in an embodiment may obtain (or input) at least one command to be set for the shortcut instruction.

In an embodiment, the processor 160 may obtain at least one command to be performed when a voice inputted from a user while the voice recognition function is executed corresponds to the shortcut instruction (hereinafter, referred to as "at least one command related to the shortcut instruction"), according to various methods (or by selecting at least one method of various methods).

In an embodiment, the processor 160 may obtain at least one command related to the shortcut instruction, based on an application or a service which is provided (or suggested) by a voice recognition application (or the intelligent server 200 or the service server 300). For example, in response to a user input of selecting a method of using at least one command provided by the voice recognition application from various methods for obtaining at least one command related to the shortcut instruction being received, the processor 160 may display a screen as shown on a screen 901 of FIG. 9 through the display 140. The processor 160 may display a list including an application or service provided by the voice recognition application in a region 930 through the display 140. In response to an input of selecting an application or service provided by the voice recognition application being received from the user, the processor 160 may display at least one command related to the selected application or service through the display 140. The processor 160 may select at least one command related to the selected application or service, and may obtain the selected at least one command as at least one command related to the shortcut instruction.

In an embodiment, the processor 160 may obtain at least one command related to the shortcut instruction, based on a voice inputted from the user. For example, in response to a user input of selecting a method of using a voice input from the various methods for obtaining at least one command related to the shortcut instruction being received, the processor 160 may display a screen as shown on a screen 903 of FIG. 9 through the display 140. The processor 160 may convert the voice inputted by the user into a text by using the voice recognition module, and may obtain the converted text as at least one command related to the shortcut instruction.

In an embodiment, the processor 160 may obtain at least one command related to the shortcut instruction, based on a text inputted by the user by using the keyboard. For example, in response to a user input of selecting a method of using a text input by using the keyboard from the various methods for obtaining at least one command related to the shortcut instruction being received, the processor 160 may display a screen as shown on a screen 905 of FIG. 9 through the display 140. When a text is inputted by using the keyboard, the processor 160 may obtain the inputted text as at least one command related to the shortcut instruction.

In an embodiment, the processor 160 may obtain at least one command related to the shortcut instruction by selecting a command regarding a function (or a voice command function that has been performed previously (or recently). For example, in response to a user input of selecting a method of using a command regarding a function that has been previously performed from the various methods for obtaining at least one command related to the shortcut instruction being received, the processor 160 may display a list including commands regarding functions that have been previously performed through the display 140. In response to a user input of selecting a command regarding a function that has been previously performed, the processor 160 may obtain the selected command regarding the previously performed function as at least one command related to the shortcut instruction.

In operation 417, the processor 160 in an embodiment may display a portion that can be corrected (or edited) in the at least one command related to the shortcut instruction according to a designated method.

In an embodiment, when the at least one command related to the shortcut instruction is obtained, the processor 160 may display the at least one command related to the shortcut instruction through the display 140. The processor 160 may display a portion that can be corrected by the user in the at least one command related to the shortcut instruction to be distinguished from the other portion through the display 140 (or may highlight the portion). For example, as shown on a screen 1001 of FIG. 10, the processor 160 may display a portion 1045 (or "San Francisco") that can be corrected by the user in a command 1041 (or "Tell me the weather in San Francisco") related to the shortcut instruction bolder than a portion that cannot be corrected (or "Tell me the weather") (or display the text in bold type). However, the method of displaying the portion that can be corrected by the user in the at least one command related to the shortcut instruction to be distinguished from the other portion is not limited to the above-described example. For example, the processor 160 may display the color or shade of the portion that can be corrected by the user in the at least one command related to the shortcut instruction to be different from the other portion that cannot be corrected, through the display 140.

Figure 11:
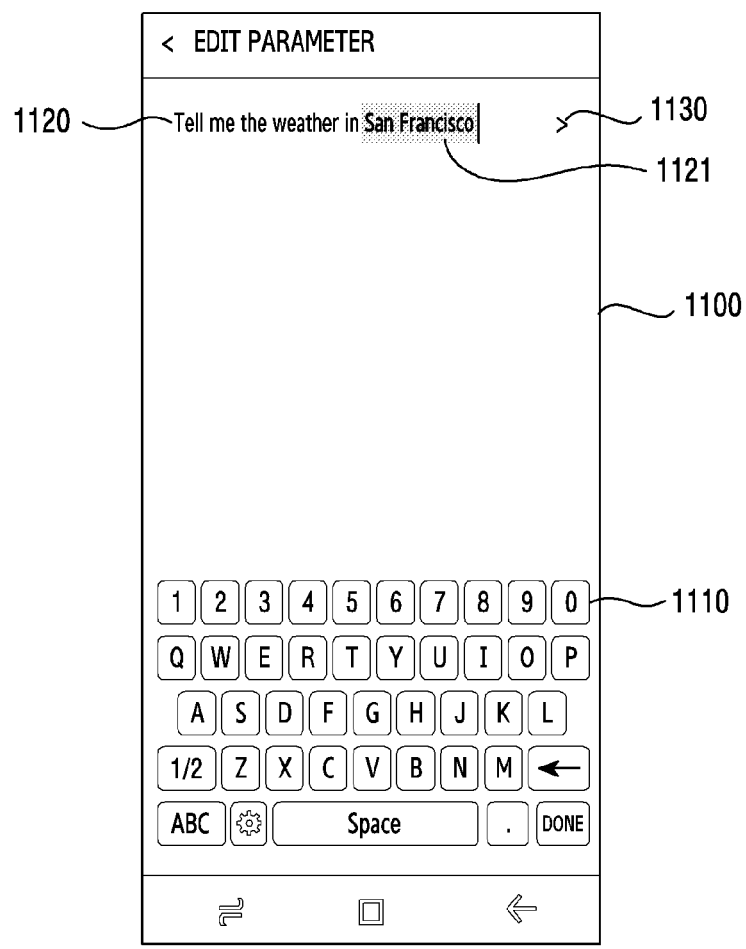
FIG. 11 is a view illustrating the method for setting the quick command function according to various embodiments.

In an embodiment, the processor 160 may correct the portion that can be corrected in the at least one command related to the shortcut instruction, based on a user input. For example, based on a user input of selecting the portion that can be corrected by the user in the at least one command related to the shortcut instruction, the processor 160 may display, through the display 140, a screen 1100 including a correctable portion 1121 that can be corrected by the user in the command "Tell me the weather in San Francisco" 1120, and a keyboard 1110, as shown in FIG. 11. The processor 160 may correct the correctable portion 1121 based on a user input using the keyboard 1110.

In operation 419, the processor 160 in an embodiment may set the quick command function based on a user input for setting the quick command function.

In an embodiment, when the correctable portion in the at least one command related to the shortcut instruction is corrected and then the quick command function is set based on the user input, the processor 160 may store information regarding the set quick command function in the memory 150. In an embodiment, when the quick command function is set, the processor 160 may transmit the information regarding the set quick command function to a server (for example, the intelligent server 200, etc.).

Figure 5:
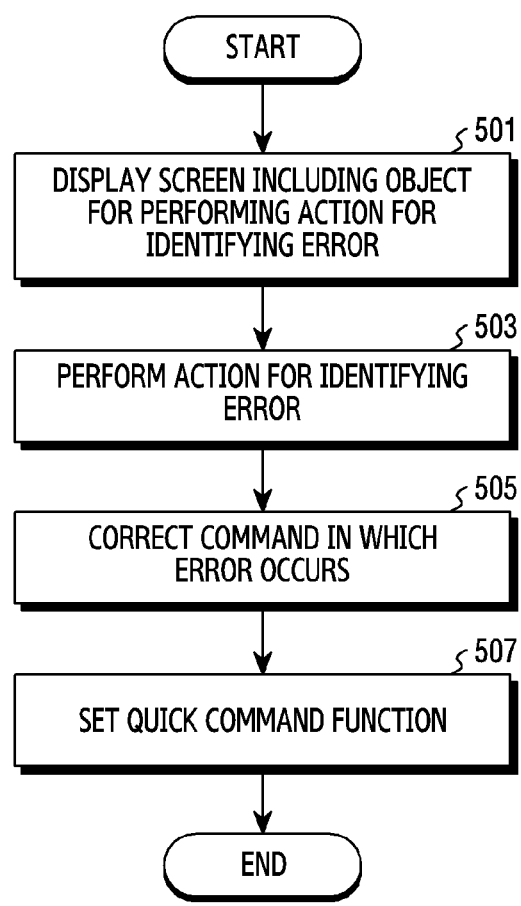
FIG. 5 is a flowchart illustrating a method for correcting an error which may occur when a quick command function is executed, while setting the quick command function according to various embodiments.

FIG. 5 is a flowchart illustrating a method for correcting an error that may occur when a quick command function is executed while setting the quick command function according to various embodiments.

Referring to FIG. 5, in operation 501, the processor 160 may display, through the display 140, a screen including an object for performing an action of identifying an error which may occur when a quick command function (hereinafter, referred to as an "error"), while setting the quick command function.

Figure 12:
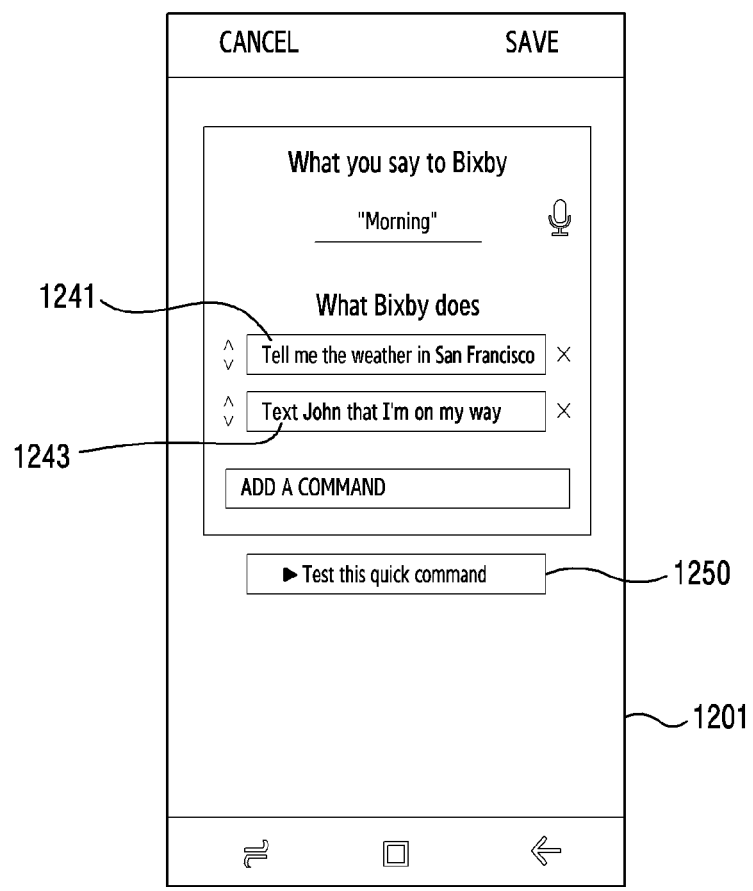
FIG. 12 is a view illustrating a method for correcting an error which may occur when a quick command function is executed, while setting the quick command function according to various embodiments.

In an embodiment, when a shortcut instruction and at least one command related to the shortcut instruction are obtained, the processor 160 may display, through the display 140, an object for performing an action of identifying an error, along with the shortcut instruction and the at least one command related to the shortcut instruction obtained. For example, when the shortcut instruction and the at least one command related to the shortcut instruction are obtained, the processor 160 display an object 1250 for performing an action of identifying an error, along with the commands "Tell me the weather in San Francisco" 1241 and "Text John that I'm on my way" 1243, through the display 140 as shown in FIG. 12.

In an embodiment, the error may include a case in which at least one function regarding the at least one command related to the shortcut instruction cannot be executed when the quick command function is executed. For example, the error may be a case in which the message "I'm on my way" cannot be transmitted to "John" like a case in which the at least one command related to the shortcut instruction is "Text John that I'm on my way" and a contact corresponding to "John" (or the other party) is not registered at a phone book. In another example, the error may be a case in which a function regarding a command like "Turn on an air conditioner on Jul. 6, 2018" cannot be executed like a case in which the at least one command related to the shortcut instruction is "Turn on an air conditioner on Jul. 6, 2018" and the current date is Aug. 2, 2018.

In an embodiment, the error may include a case in which a meaning of a text constituting the at least one command related to the shortcut instruction cannot be recognized (understood) like a case in which a text constituting the at least one command related to the shortcut instruction is a special character or a symbol.

However, the error is not limited to the above-described embodiments, and may include all cases in which at least one function regarding the at least one command related to the shortcut instruction cannot be normally performed when the quick command function is executed.

In operation 503, the processor 160 in an embodiment may perform the action of identifying the error.

In an embodiment, in response to a user input for performing the action of identifying the error, for example, a user input on the object 1250 of FIG. 12, being received, the processor 160 may execute (or test or simulate) the at least one command related to the shortcut instruction to identify the error.

In an embodiment, when a plurality of commands are related to the shortcut instruction, the processor 160 may execute a plurality of functions regarding the plurality of commands in sequence based on an order (or a rank) set for the plurality of commands. In an embodiment, the processor 160 may execute at least a part of the plurality of functions regarding the plurality of commands or at least a part of each of the plurality of functions in association with the intelligent server 200.

In an embodiment, when performing the action of identifying the error, the processor 160 may perform all or a part of actions for executing the function regarding the command related to the shortcut instruction according to the command (or the function regarding the command), an application or service for performing the command. For example, when the command is "Today weather," the processor 160 may perform all of the actions for providing information regarding the today weather. In another example, when the command is "Text John that I'm on my way," the processor 160 may perform an action before transmitting the message like "I'm on my way" to the other party, for example, the electronic device of "John" (for example, an action of identifying whether a contact corresponding to the other party to receive the message, for example, "John," is stored in the phone book), and may not perform the action of transmitting the message like "I'm on my way" to the electronic device of "John."

In an embodiment, when an error occurs while the at least one function regarding the at least one command related to the shortcut instruction is being executed, the processor 160 may display information indicating that the error occurs through the display 140. For example, when an error occurs while the at least one function regarding the at least one command related to the shortcut instruction is being executed, the processor 160 may display information 1320 indicating that the error occurs through the display 140 as shown on a screen 1303 of FIG. 13.

Figure 14:
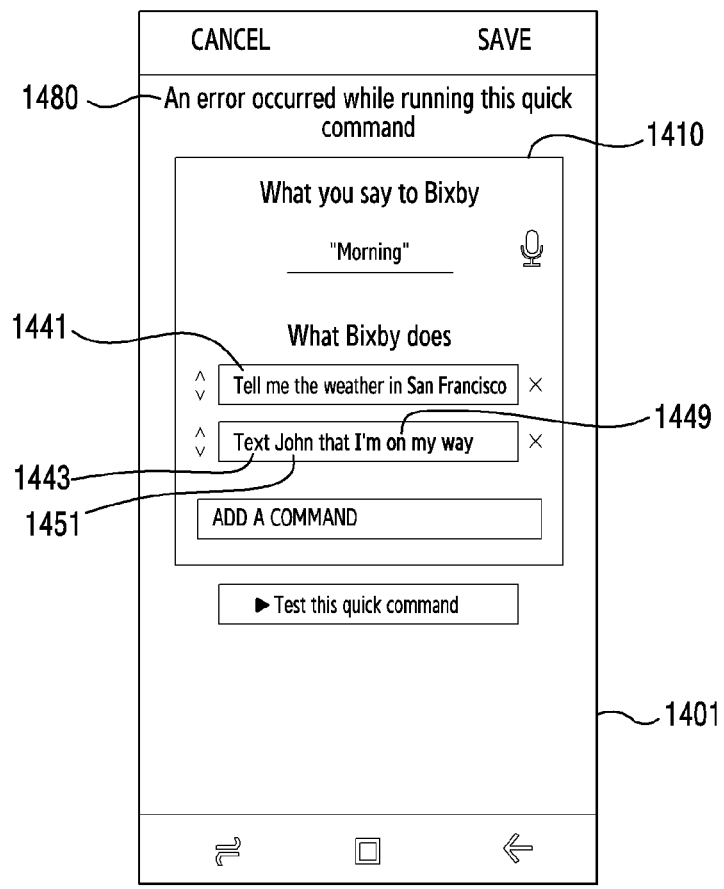
FIG. 14 is a view illustrating the method for correcting the error which may occur when the quick command function is executed, while setting the quick command function according to various embodiments.

In an embodiment, when an error occurs when the at least one function regarding the at least one command related to the shortcut instruction is being executed, the processor 160 may display a portion that is a cause of the error in the command where the error occurs to be distinguished from the other portion. For example, the processor 160 may display the color of a portion 1451 which is a cause of the error in the command where the error occurs to be different from the other portion through the display 140 as shown in FIG. 14. However, the method of displaying the portion which is the cause of the error to be distinguished from the other portion is not limited to the method of displaying the color differently.

In operation 505, the processor 160 in an embodiment may correct the command where the error occurs, based on a user input. For example, based on a user input of selecting the portion which is the cause of the error (or an area including the portion which is the cause of the error) by the user in the command where the error occurs, the processor 160 may display a screen 1501 including the command where the error occurs, "Text John that I'm on my way" 1520, and a keyboard 1510 through the display 140 as shown on the screen 1501 of FIG. 15. The processor 160 may correct the portion 1521 which is the cause of the error based on a user input using the keyboard 1510.

In operation 507, the processor 160 in an embodiment may set the quick command function based on a user input for setting the quick command function.

In an embodiment, when the portion which is the cause of the error is corrected and then the quick command function is set based on the user input, the processor 160 may store information regarding the set quick command function in the memory 150. In an embodiment, when the quick command function is set, the processor 160 may transmit the information regarding the set quick command function to a server (for example, the intelligent server 200, etc.).

Figure 6:
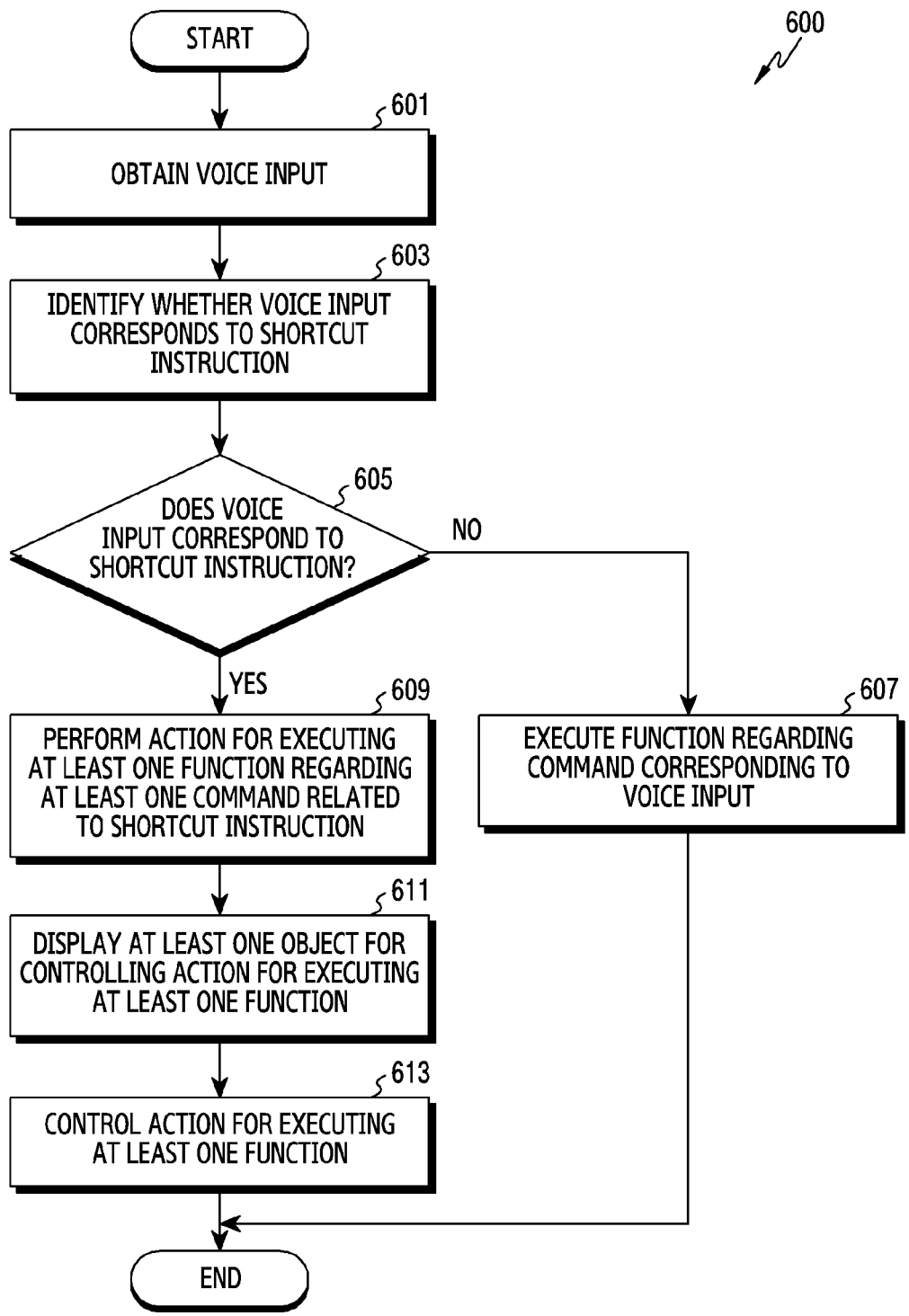
FIG. 6 is a flowchart illustrating a method for controlling an action for executing at least one function regarding at least one command related to a shortcut instruction while executing a quick command function according to various embodiments.

FIG. 6 is a flowchart illustrating a method 600 for controlling an action for executing at least one function regarding at least one command related to a shortcut instruction while executing a quick command function according to various embodiments.

In operation 601, the processor 160 in an embodiment may obtain a voice input through the microphone 120.

Figure 16:
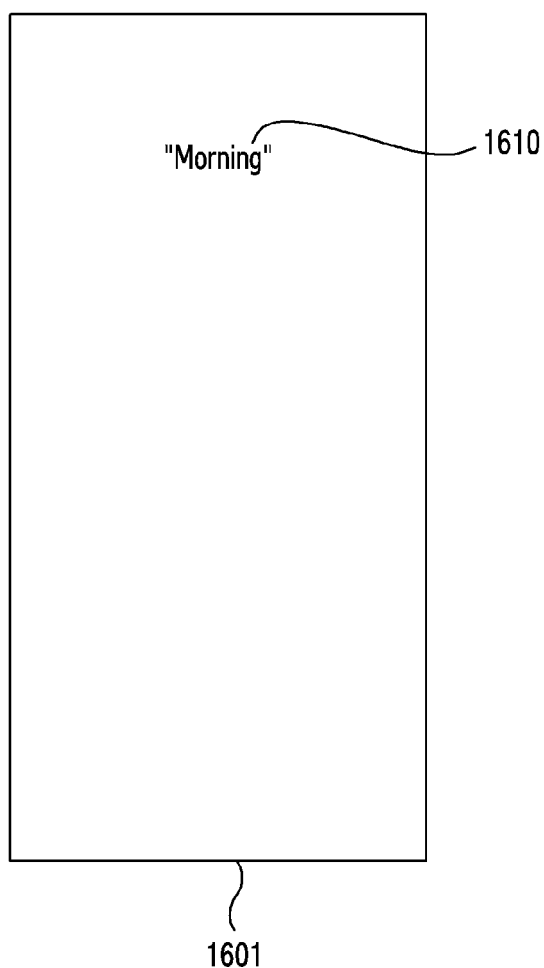
FIG. 16 is a view illustrating a method for controlling an action for executing at least one function regarding at least one command related to a shortcut instruction while executing a quick command function according to various embodiments.

In an embodiment, when an input for activating a voice recognition function (or a voice recognition application) is received from a user, the processor 160 may activate the microphone 120. The processor 160 may obtain a voice input from the user through the activated microphone 120. The processor 160 may convert the voice input obtained from the user into a text by using the voice recognition module. The processor 160 may display the converted text through the display 140. For example, as shown in FIG. 16, the processor 160 may display the text converted from the voice input, "Morning" 160, on a screen 1601 through the display 140.

In operation 603, the processor 160 in an embodiment may identify whether the voice input (or the text converted from the voice input) corresponds to a shortcut instruction. For example, the processor 160 may identify whether the obtained voice input is identical to a shortcut instruction stored in the memory 150 by setting the quick command function.

When it is identified that the voice input does not correspond to the shortcut instruction in operation 605, the processor 160 in an embodiment may execute a function regarding a command corresponding to the voice input in operation 607. For example, the processor 160 may execute the function regarding (or corresponding to) "morning" as a command (or a normal voice command function regarding "morning" as a command).

When it is identified that the voice input corresponds to the shortcut instruction in operation 605, in operation 609, the processor 160 in an embodiment may perform an action for executing at least one function regarding at least one command related to the shortcut instruction (hereinafter, referred to as "at least one function executing action").

In an embodiment, the processor 160 may transmit information regarding at least one command related to the shortcut instruction to the intelligent server 200 through the communication interface 110. In an embodiment, the processor 160 may transmit information necessary for executing at least one function regarding at least one command related to the shortcut instruction to the intelligent server 200 through the communication unit 110. In an embodiment, the processor 160 may perform at least a part of the at least one function executing action.

In an embodiment, when a plurality of commands are related to the shortcut instruction, the processor 160 may execute a plurality of functions regarding the plurality of commands in sequence based on an order (or rank) set for the plurality of commands. In an embodiment, the processor 160 may execute at least a part of the plurality of functions regarding the plurality of commands, or at least a part of a function of each of the plurality of functions in association with the intelligent server 200.

In operation 611, the processor 160 in an embodiment may display at least one object for controlling the at least one function executing action through the display 140.

In an embodiment, the processor 160 may display at least one object for controlling the at least one function executing action through the display 140 while executing the at least one function executing action.

In an embodiment, the at least one object may include an object for temporarily stopping (or pausing and resuming) the at least one function executing action (hereinafter, referred to as a "first object"). For example, the at least one object may include a first object 1711 of FIG. 17.

In an embodiment, the at least one object may include an object for skipping (or omitting) the at least one function executing action (hereinafter, referred to as a "second object").

In an embodiment, the processor 160 may determine a position of the at least one object by considering a position of information indicating a result of executing the at least one function regarding the at least one command related to the shortcut instruction. For example, the processor 160 may determine to display the at least one object in a region where the information indicating the result of executing the at least one function regarding the at least one command related to the shortcut instruction is not displayed (or a region which does not overlap the information indicating the result of executing the at least one function). However, the display position of the at least one object is not limited to the above-described example.

In operation 613, the processor 160 may control the action for executing the at least one function in response to a user input on the at least one object.

In an embodiment, in response to an input on the first object being received from the user, the processor 160 may temporarily stop the at least one function executing action. For example, when a plurality of commands are related to the shortcut instruction and an input on the first object is received from the user while a function regarding the second command among the plurality of commands is being executed, the processor 160 may not output a received result of executing even if the result of executing the function regarding the second command is received from the intelligent server 200. In another example, when a plurality of commands are related to the shortcut instruction and an input on the first object is received from the user while the function regarding the second command among the plurality of commands is being executed, the processor 160 may transmit, to the intelligent server 200 through the communication interface 110, information for letting the intelligent server 200 stop the action for executing the function regarding the second command. In still another example, when a plurality of commands are related to the shortcut instruction and an input on the first object is received from the user while the function regarding the second command among the plurality of commands is being executed, the processor 160 may not perform a part of the action for executing the function regarding the second command to be executed in the electronic device.

Figure 20:
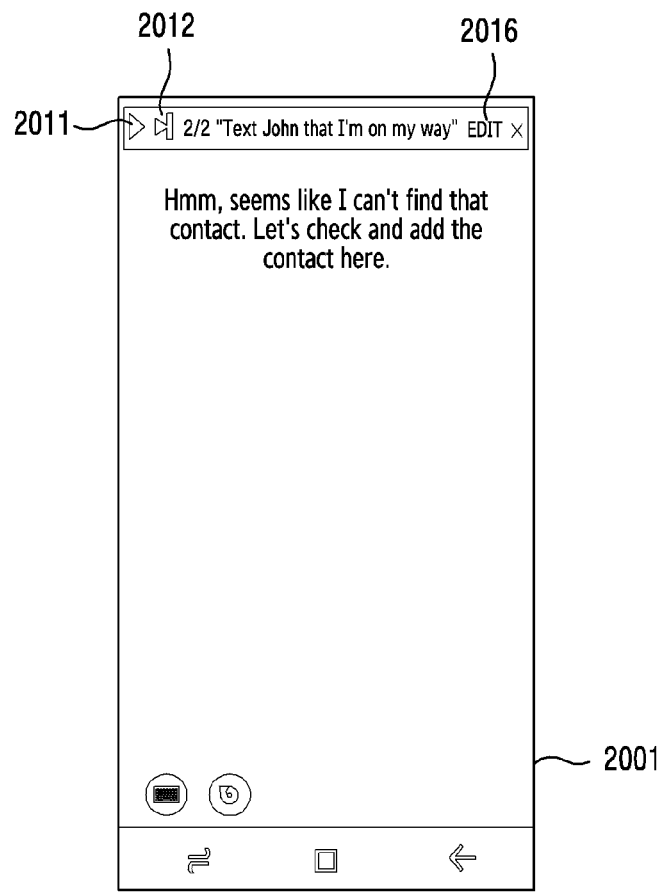
FIG. 20 is a view illustrating the method for controlling the action for executing the at least one function regarding the at least one command related to the shortcut instruction while executing the quick command function according to various embodiments.

In an embodiment, when an input on the first object is received from the user, the processor 160 may display, through the display 140, an object for displaying a screen for correcting (or editing) at least one command related to the shortcut instruction or for correcting an error. For example, when an input on the first object is received from the user, the processor 160 may display, through the display 140, an object 2016 for displaying a screen (for example, a screen 2101 of FIG. 21) for correcting (or editing) the at least one command related to the shortcut instruction or for correcting an error (or an object for correcting the at least one command) as shown in FIG. 20.

Figure 19:
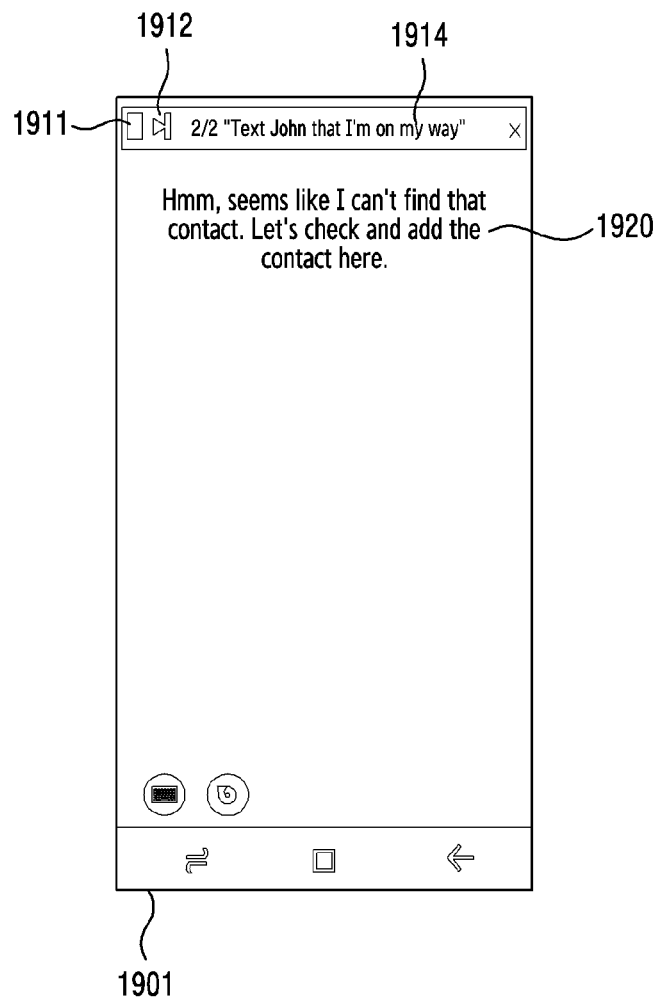
FIG. 19 is a view illustrating the method for controlling the action for executing the at least one function regarding the at least one command related to the shortcut instruction while executing the quick command function according to various embodiments.

In an embodiment, in the state in which the at least one function executing action is temporarily stopped in response to the user input on the first object, when an input on the first object is received from the user, the processor 160 may resume the at least one function executing action. For example, in the state in which the at least one function executing action is temporarily stopped in response to a user input on a first object 1911 as shown in FIG. 19, when an input on the first object 2011 is received from the user as shown in FIG. 20, the processor 160 may resume the at least one function executing action which was being executed at the time of temporarily stopping.

In an embodiment, when an input on the second object is received from the user, the processor 160 may stop the action for executing the function regarding the command which is being currently performed, and may perform an action for executing a function of a next command (or a command of a next order) of the command which is being currently performed. For example, when a plurality of commands are related to the shortcut instruction and an input on the second object is received from the user while the action for executing the function regarding the first command among the plurality of commands is being performed, the processor 160 may perform the action for executing the function regarding the second command (or may start performing the action for executing the function regarding the second command) without performing the action for executing the function regarding the first command.

In an embodiment, when an input on the second object is received from the user, the processor 160 may display, through the display 140, an object for displaying a screen for correcting (or editing) the at least one command related to the shortcut instruction or correcting an error.

In an embodiment, when an input on the second object is received from the user, the processor 160 may stop the action for executing the function regarding the command which is being currently performed, and may wait before performing the action for executing the function of the next command (or command of the next order) of the command which is being currently performed. In response to a user input being received while waiting to perform the action for executing the function of the next command (or command of the next order), the processor 160 may perform the action for executing the function of the next command (or command of the next order) of the command which is being performed.

In the above-described embodiments, the first object and the second object are illustrated as the at least one object, but are not limited thereto. For example, the at least one object may include various objects as shown in FIG. 18.

Figure 18:
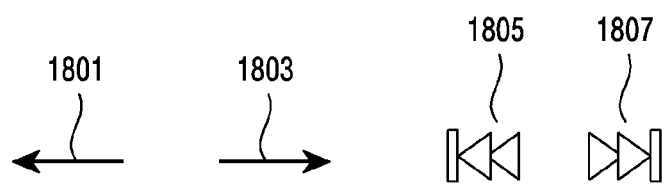
FIG. 18 is a view illustrating the method for controlling the action for executing the at least one function regarding the at least one command related to the shortcut instruction while executing the quick command function according to various embodiments.

In an embodiment, objects 1801, 1803 of FIG. 18 may be objects for moving to pages on which results of the plurality of functions regarding the plurality of commands are displayed, respectively, when all of the plurality of functions regarding the plurality of commands related to the shortcut instruction are executed. For example, in a state in which all of the plurality of functions regarding the plurality of commands related to the shortcut instruction are executed and then a page indicating a result of executing a function regarding the last command is displayed through the display 140, when a user input on the object 1801 is received, the processor 160 may move to a page displaying a result of executing a function regarding a previous command of the last command. When a user input on the object 1803 is received in the state in which the movement to the page displaying the result of executing the function regarding the previous command of the last command is performed, the processor 160 may move to the page displaying the result of executing the function of the next command of the result of executing the function of the currently displayed command, for example, to the page displaying the result of executing the function of the last command.

In an embodiment, objects 1805, 1807 of FIG. 18 may be objects for executing the action of executing the function of the first command or the function of the last command, while the plurality of functions regarding the plurality of commands related to the shortcut instruction are being executed. For example, in a state in which the number of the plurality of commands related to the shortcut instructions is 5 and a function regarding the third command is being executed, when a user input on the object 1805 is received, the processor 160 may perform an action for executing a function regarding the first command. In another example, in the state in which the number of the plurality of commands related to the shortcut instructions is 5 and the function of the third command is being executed, when a user input on the object 1807 is received, the processor 160 may perform an action for performing a function of the fifth command.

However, the at least one object is not limited to the first object, the second object, or the objects 1801-1807 of FIG. 18.

Figure 8:
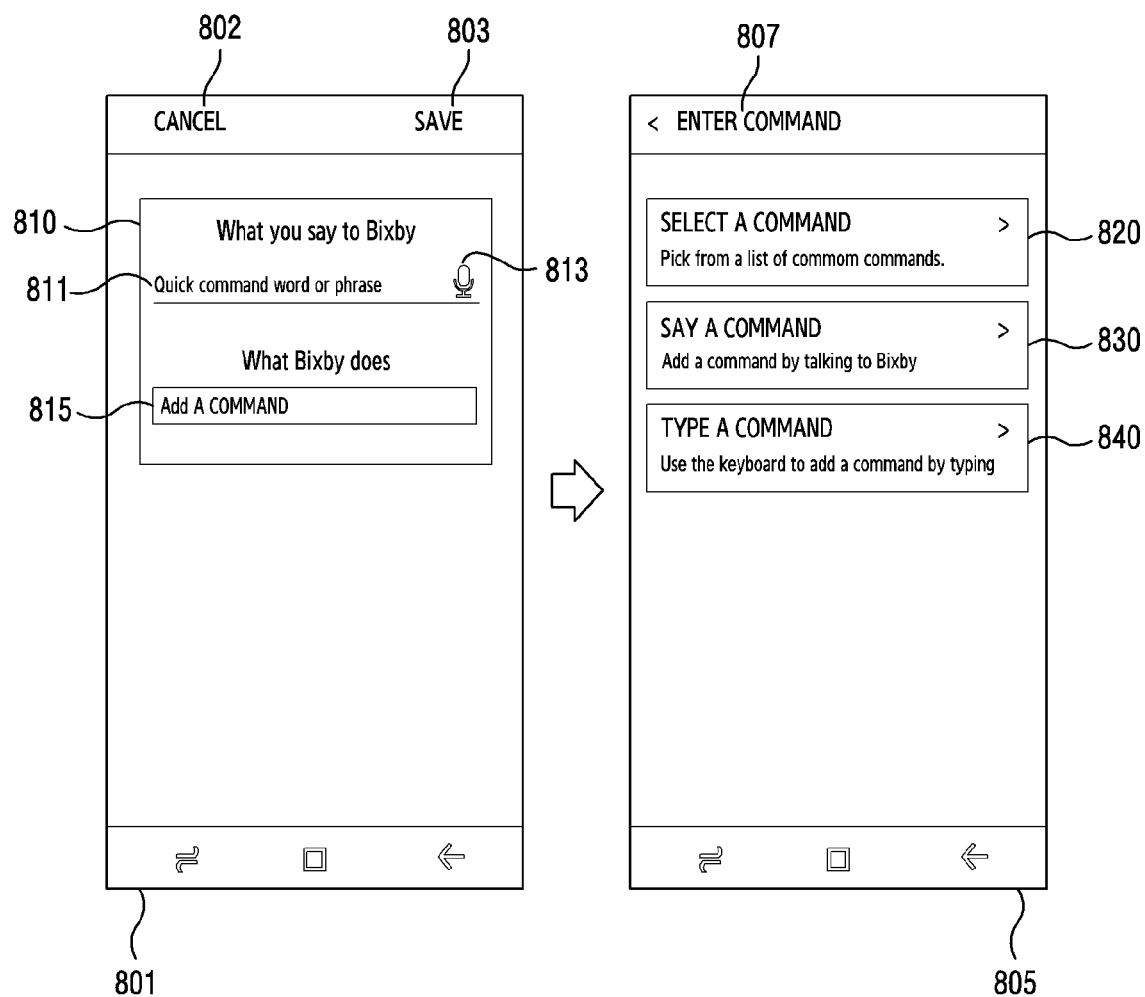
FIG. 8 is a view illustrating the method for setting the quick command function according to various embodiments.
Figure 9:
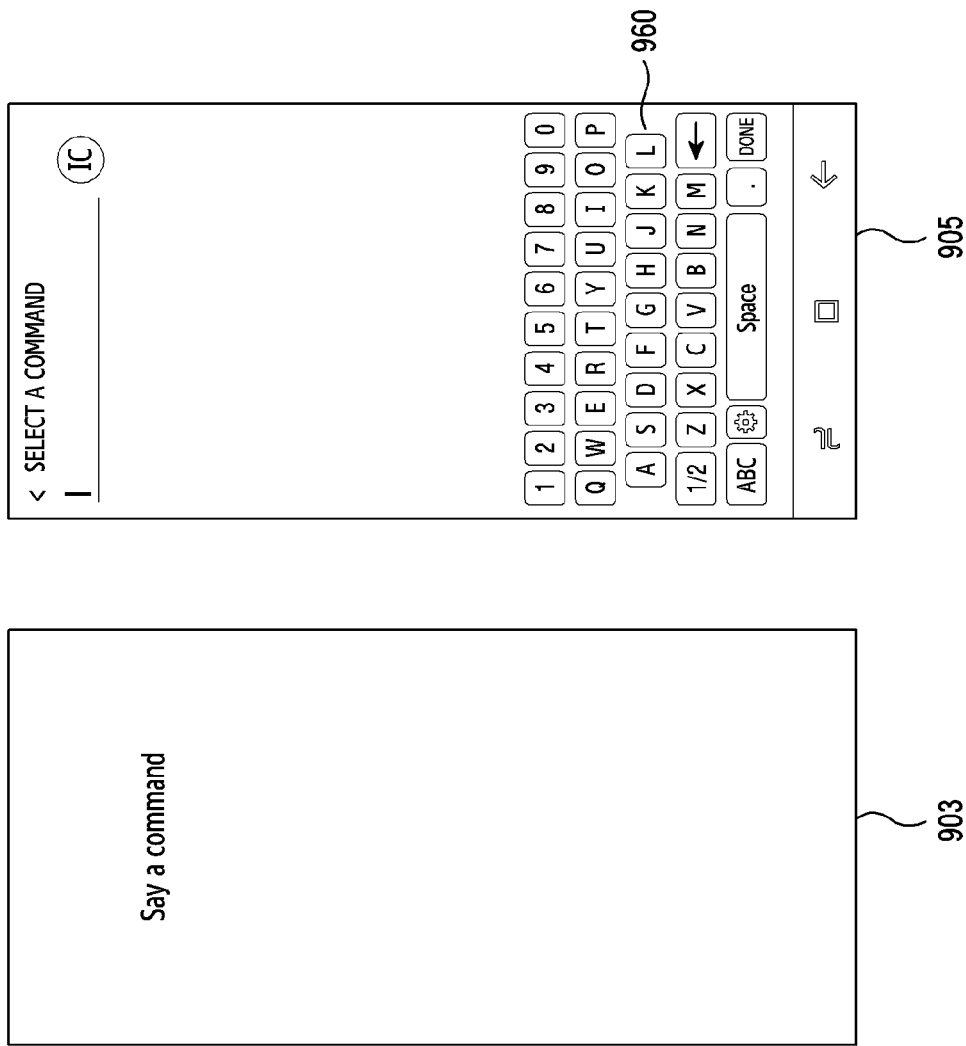
FIG. 9 is a view illustrating the method for setting the quick command function according to various embodiments.
Figure 9:
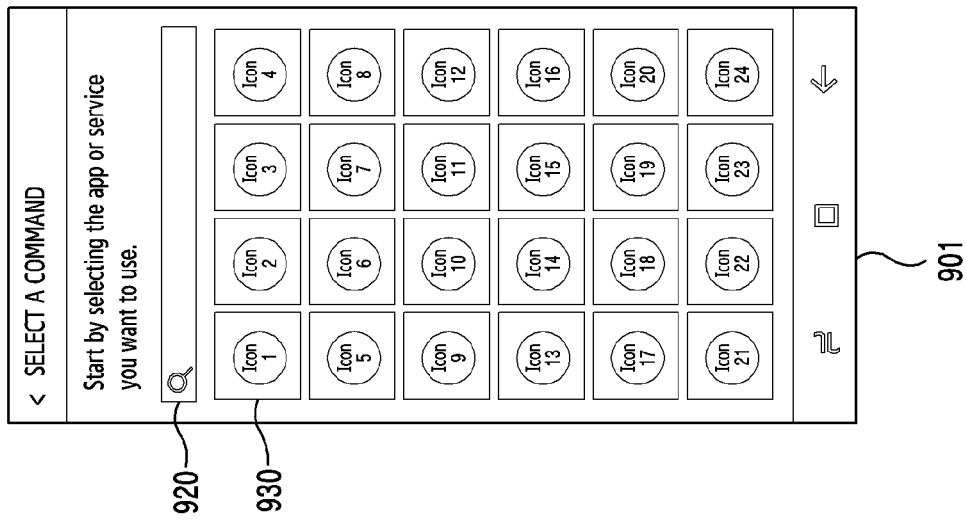
Figure 10:
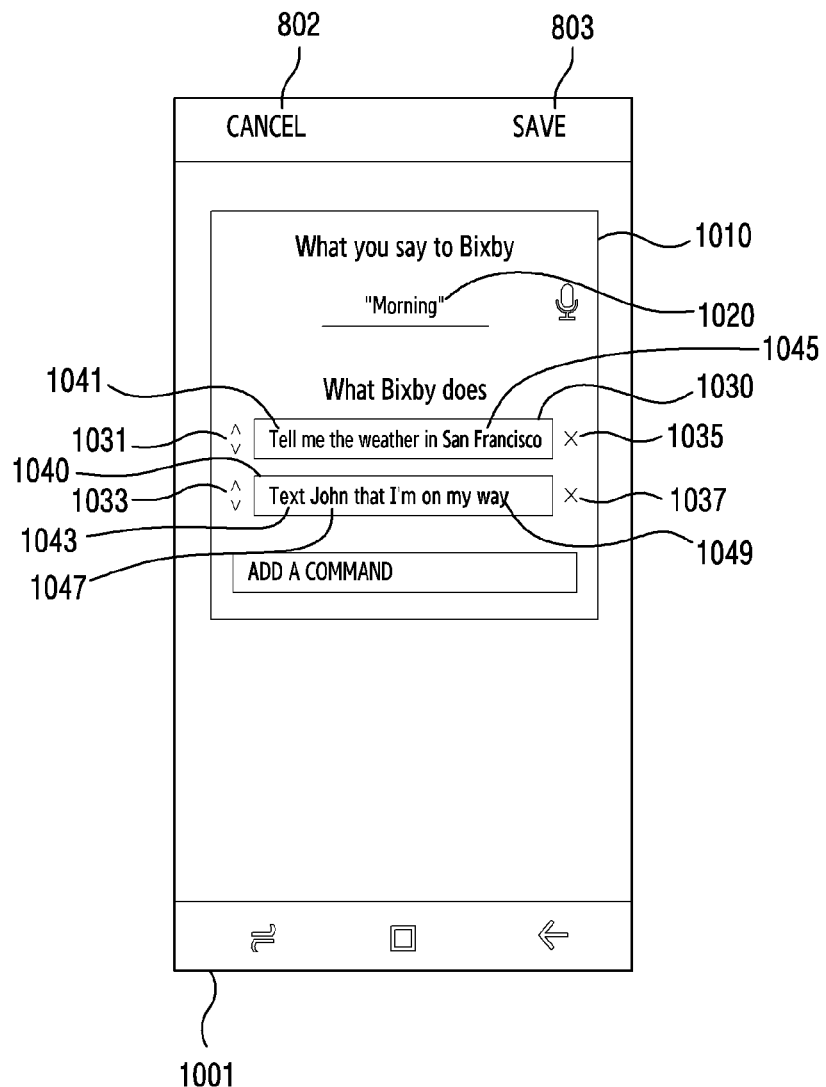
FIG. 10 is a view illustrating the method for setting the quick command function according to various embodiments.

FIG. 7 is a view illustrating a method for setting a quick command function according to various embodiments, FIG. 8 is a view illustrating the method for setting the quick command function according to various embodiments, FIG. 9 is a view illustrating the method for setting the quick command function according to various embodiments, FIG. 10 is a view illustrating the method for setting the quick command function according to various embodiments, and FIG. 11 is a view illustrating the method for setting the quick command function according to various embodiments.

Referring to FIGS. 7, 8, 9, 10, and 11, in an embodiment, a screen 701 of FIG. 7 may be a screen (or default screen) for setting the quick command function.

In an embodiment, information 702 may indicate that the screen 701 is a screen for setting the quick command function. In an embodiment, when a user input on the information 702 is received, the processor 160 may display a main screen of a voice recognition application or may display a previously displayed screen through the display 140.

In an embodiment, an object 703 may be an object for displaying a screen through which the user newly inputs a shortcut instruction and at least one command related to the shortcut instruction. For example, when an input on the object 703 is received, the processor 160 may display a screen 801 of FIG. 8 through the display 140.

In an embodiment, an object 705 may be an object for executing a function of displaying a screen including a tutorial regarding a method for using the quick command function, and for executing a function of displaying a screen for deleting a set shortcut instruction or at least one of at least one command related to the short instruction.

In an embodiment, a short instruction provided (or recommended 707) by the voice recognition application (or the intelligent server 200) and at least one command related to the shortcut instruction may be displayed in regions 710, 720. For example, a shortcut instruction 711 provided by the voice recognition application and a plurality of commands 713 related to the shortcut instruction 711 may be displayed in the region 710. When a swipe input on the region 710 is received from the user, a shortcut instruction and at least one command related to the shortcut instruction, which are included in the region 720, may be displayed. In an embodiment, when a user input on an object 715 is received, the processor 160 may set the quick command function based on the shortcut instruction 711 and the plurality of commands 713 included in the region 710. In an embodiment, when the user input on the object 715 is received, the region 710 may move to a region 740. For example, when the user input on the object 715 is received, the shortcut instruction 711 and the plurality of commands 713 included in the region 710 may be displayed in replacement of a shortcut instruction 741 and commands 743 included in the region 740.

In an embodiment, a region 730 may be a region for executing a function of displaying a list of a shortcut instruction provided by the voice recognition application and at least one command related to the shortcut instruction. For example, when a user input on the region 730 is received, the processor 160 may display, through the display 140, the shortcut instruction provided by the voice recognition application and the at least one command that are provided by the voice recognition application but are not displayed on the screen 701, along with the shortcut instruction 711 and the plurality of commands 713 included in the region 710.

In an embodiment, information 709 may be information indicating that the quick command function is set for the shortcut instructions 741, 751 and the commands 743, 753 included in the regions 740, 750 positioned below the display position of the information 709.

In an embodiment, the shortcut instruction 741 and the commands 743 displayed in the region 740 may be a shortcut instruction and commands which are set for the quick command function most recently. In an embodiment, an object 745 (or a badge) may indicate that the shortcut instruction 741 and the commands 743 are newly set (or added).

In an embodiment, when a user input on the region 740 (or region 750) is received, the processor 160 may display, through the display 140, a screen for correcting (or editing) the shortcut instruction or at least one command related to the shortcut instruction included in the region 740 (or region 750).

In an embodiment, the screen 801 of FIG. 8 may be a screen through which a shortcut instruction and at least one command related to the shortcut instruction are newly inputted. In an embodiment, in response to a user input on the object 703 of FIG. 7 being received, the processor 160 may display the screen 801 of FIG. 1 through the display 140.

In an embodiment, when a user input on a region 802 is received, the processor 160 may cancel the action of newly inputting a shortcut instruction and at least one command related to the shortcut instruction.

In an embodiment, when a user input on a region 803 is received, the processor 160 may set the quick command function based on a newly inputted shortcut instruction and at least one command related to the shortcut instruction. In an embodiment, when a shortcut instruction and at least one command related to the shortcut instruction are not inputted as shown on the screen 801 of FIG. 8, the region 803 may be in an inactivation state. When a shortcut instruction and at least one command related to the shortcut instruction are inputted, the region 803 may be activated to set the quick command function based on the shortcut instruction and the at least one command related to the shortcut instruction which are inputted (or to set the quick command function in response to a user input for setting the quick command function being received).

In an embodiment, a region 810 may include a field 811 for inputting a shortcut instruction by using a keyboard, an object 813 for inputting a shortcut instruction by using a voice input, and a field 815 for inputting at least one command by using a method selected by the user from various methods.

In an embodiment, when the processor 160 receives a user input on the field 811, the processor 160 may display a keyboard for inputting a text through the display 140. When a text is inputted by using the keyboard, the processor 160 may input the inputted text into the field 811 (or may display the text through the display 140).

In an embodiment, when the processor 160 receives a user input on the object 813, the processor 160 may display a screen indicating that a voice input can be received from the user through the display 140. The processor 160 may convert the voice inputted from the user into a text by using the voice recognition module, and may input the converted text into the field 811.

In an embodiment, in response to a user input on the field 815 being received, the processor 160 may display a screen 805 to select at least one of various methods for obtaining at least one command related to the shortcut instruction through the display 140.

In an embodiment, a region 820 may be a region for inputting at least one command related to the shortcut instruction, based on an application or a service provided (or recommended) by the voice recognition application. For example, when a user input on the region 820 is received, the processor 160 may display a screen as shown on a screen 901 of FIG. 9 through the display 140. The processor 160 may display a list including an application or service provided by the voice recognition application in the region 930 through the display 140. In response to an input of selecting an application or service provided by the voice recognition application being received from the user, the processor 160 may display at least one command related to the selected application or service through the display 140 although it is not illustrated in FIG. 9. The processor 160 may select at least one command related to the selected application or service, and may obtain (or input to the field 815) the selected at least one command as at least one command related to the shortcut instruction. In an embodiment, the screen 901 may include a field 920 for searching an application or service provided by the voice recognition application, along with the region 930 including the list including the application or service provided by the voice recognition application.

In an embodiment, a region 830 may be a region for inputting at least one command related to the shortcut instruction based on a voice inputted from the user. In an embodiment, in response to a user input on the region 830 being received, the processor 160 may display a screen as shown on the screen 903 of FIG. 9 through the display 140. The processor 160 may convert a voice inputted from the user into a text by using the voice recognition module, and may obtain (or input to the field 815) the converted text as at least one command related to the shortcut instruction.

In an embodiment, a region 840 may be a region for inputting at least one command related to the shortcut instruction based on a text inputted by the user using the keyboard. In an embodiment, in response to a user input on the region 840 being received, the processor 160 may display a screen as shown on the screen 905 of FIG. 9 through the display 140. When a text is inputted by using the keyboard 960, the processor 160 may obtain (or input to the field 815) the inputted text as at least one command related to the shortcut instruction.

Although not shown in FIGS. 8 and 9, the processor 160 in an embodiment may obtain at least one command related to the shortcut instruction by selecting a command regarding a function (or a voice command function) which is previously (or recently) performed. For example, in response to a user input of selecting a method of using a command regarding a previously performed function from various methods for obtaining at least one command related to the shortcut instruction being received, the processor 160 may display a list including a command regarding a previously performed function through the display 140. In response to a user input of selecting the command regarding the previously performed function, the processor 160 may obtain (or input to the field 815) the selected command regarding the previously performed function as at least one command related to the shortcut instruction.

In an embodiment, when the shortcut instruction and the at least one command related to the shortcut instruction are inputted, the processor 160 may display the screen 1001 shown in FIG. 10 through the display 140.

In an embodiment, the shortcut instruction, for example, "Morning," may be displayed in a field 1020 in a region 1010, the command, for example, "Tell me the weather in San Francisco" 1041, may be displayed in a region 1030, and the command, for example, "Text John that I'm on my way" 1043, may be displayed on a region 1040.

In an embodiment, the processor 160 may display a portion that can be corrected by the user in the at least one command related to the shortcut instruction to be distinguished from the other portion (or highlight the portion) through the display 140. For example, on the screen 1001 of FIG. 10, the processor 160 may display a portion, "San Francisco" 1045, that can be corrected by the user in the command, "Tell me the weather in San Francisco" 1041, bolder than the other portion that cannot be corrected, "Tell me the weather," through the display 140 (or display the text in bold type). The processor 160 may display portions, "John" 1047 and "I'm on my way" 1049, that can be corrected by the user in the command, "Text John that I'm on my way" 1043, bolder the other portions that cannot be corrected, "Text" and "that," (or display the text in bold type) through the display 140. However, the method of displaying the portion that can be corrected by the user in the at least one command related to the shortcut instruction to be distinguished from the other portion is not limited to the above-described example. For example, the processor 160 may display the color or shade of the portion that can be corrected by the user in the at least one command related to the shortcut instruction to be different from the other portion that cannot be corrected through the display 140.

In an embodiment, the screen 1001 of FIG. 10 may further include objects 1031, 1033 to change an order of execution of a function regarding the command 1041 and a function regarding the command 1043. For example, based on a tap input or a drag input on the object 1031, the order of executing the function regarding the command 1041 and the function regarding the command 1043 may be changed. When the quick command function is executed, the processor 160 may execute the command 1041 included in the region 1030 located above the region 1040 before the command 1043.

In an embodiment, the screen 1001 of FIG. 10 may further include an object 1035 to delete the command 1041, and an object 1037 to delete the command 1043.

In an embodiment, in response to a user input of selecting the portion that can be corrected by the user in the at least one command related to the shortcut instruction, for example, "San Francisco" 1045, the processor 160 may display a screen 1100 including the command "Tell me the weather in San Francisco" 1120 and a keyboard 1110 through the display 140 as shown in FIG. 11. The processor 160 may correct the correctable portion 1121 based on a user input using the keyboard 1110. In an embodiment, in response to a user input on an object 1130 being received, the processor 160 may obtain the corrected command (or may input to the region 1030).

Figure 13:
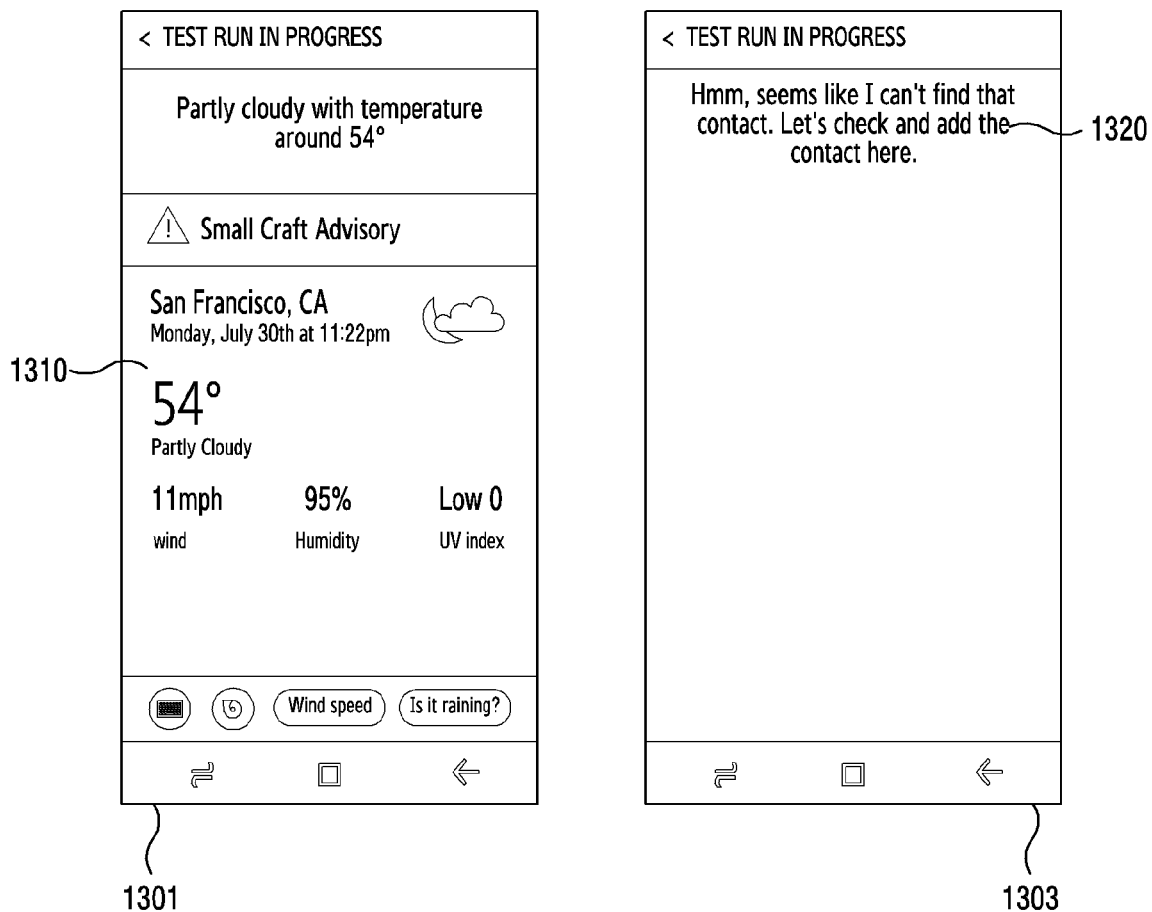
FIG. 13 is a view illustrating the method for correcting the error which may occur when the quick command function is executed, while setting the quick command function according to various embodiments.
Figure 15:
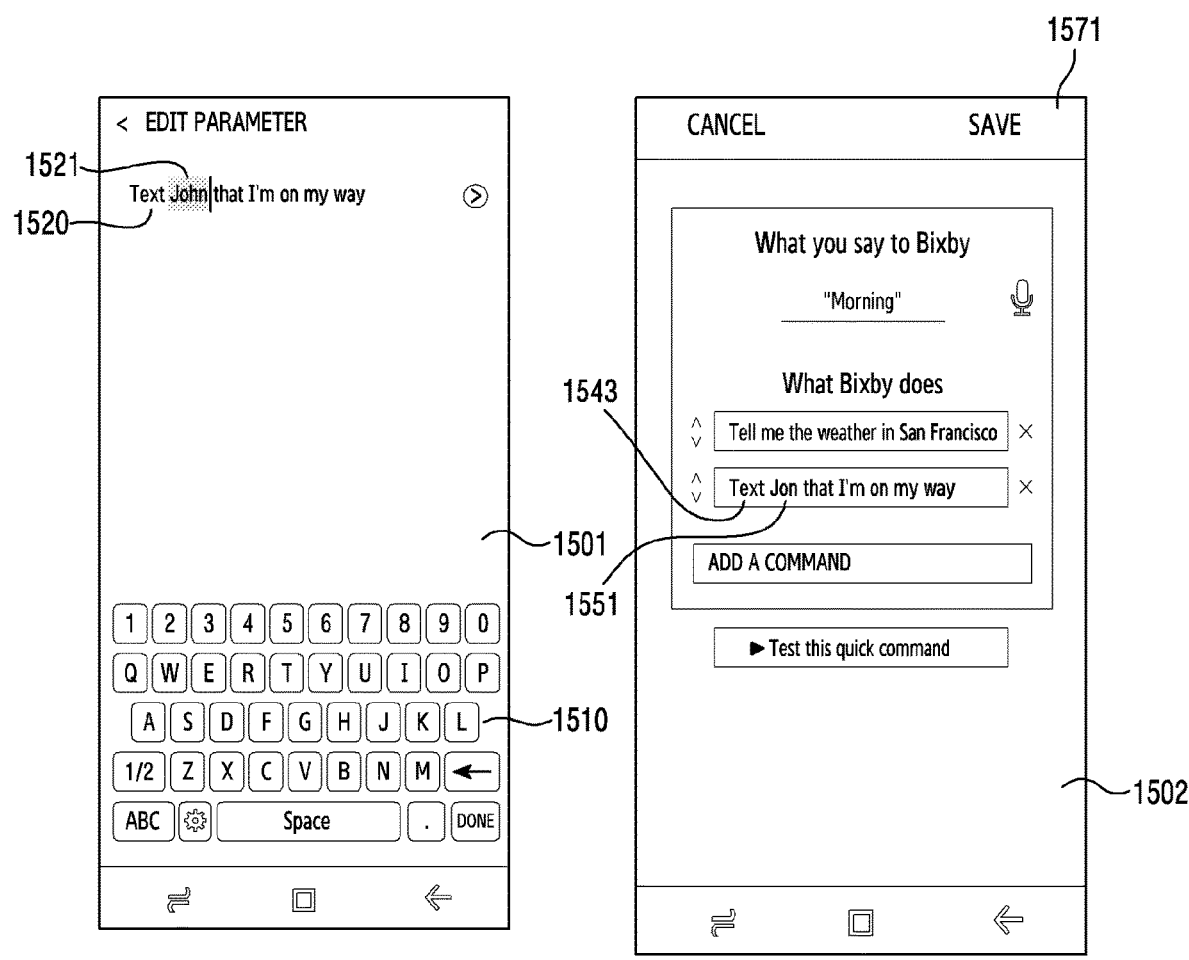
FIG. 15 is a view illustrating the method for correcting the error which may occur when the quick command function is executed, while setting the quick command function according to various embodiments.

FIG. 12 is a view illustrating a method for correcting an error which may occur when a quick command function is executed, while setting the quick command function according to various embodiments, FIG. 13 is a view illustrating the method for correcting the error which may occur when the quick command function is executed, while setting the quick command function according to various embodiments, FIG. 14 is a view illustrating the method for correcting the error which may occur when the quick command function is executed, while setting the quick command function according to various embodiments, and FIG. 15 is a view illustrating the method for correcting the error which may occur when the quick command function is executed, while setting the quick command function according to various embodiments.

Referring to FIGS. 12, 13, 14, and 15, while setting the quick command function, the processor 160 may display a screen 1201 including an object 1250 for performing an action for identifying an error through the display 140 as shown in FIG. 12.

In an embodiment, when a shortcut instruction and at least one command related to the shortcut instruction are obtained, the processor 160 may display an object for performing the action of identifying an error, along with the shortcut instruction and the at least one command related to the shortcut instruction, through the display 140. For example, when the shortcut instruction and the at least one command related to the shortcut instruction are obtained, the processor 160 may display the object 1250 for performing the action of identifying an error, along with the commands, "Tell me the weather in San Francisco" 1241 and "Text John that I'm on my way" 1243, through the display 140, as shown in FIG. 12. In an embodiment, the screen 1201 of FIG. 12 may be the same as the screen 1001 of FIG. 10 except for that the screen 1201 further includes the object 1250.

In an embodiment, in response to a user input for performing the action of identifying the error, for example, a user input on the object 1250, being received, the processor 160 may execute (or test or simulate) the at least one command related to the shortcut instruction to identify the error.

In an embodiment, when a plurality of commands are related to the shortcut instruction, the processor 160 may execute a plurality of functions regarding the plurality of commands in sequence based on an order (or rank) set for the plurality of commands.

In an embodiment, a screen 1301 of FIG. 13 may be a screen executing (or an execution result screen) a function regarding the command "Tell me the weather in San Francisco" 1241. The screen 1301 may include information 1310 regarding the weather of San Francisco as the function regarding the command "Tell me the weather in San Francisco" 1241. In an embodiment, the screen 1301 may be a screen displayed when the function regarding the command "Tell me the weather in San Francisco" 1241 is executed without an error.

In an embodiment, a screen 1303 of FIG. 13 may be a screen executing (or an execution result screen) a function regarding the command "Text John that I'm on my way" 1243. The screen 1303 may be a screen displayed when an error occurs while the function regarding the command "Text John that I'm on my way" 1243 is being executed. For example, the screen 1303 of FIG. 13 may be a screen that is displayed when the message "I'm on my way" cannot be sent to "John" like the case in which a contact corresponding to "John" (the other party) in the command "Text John that I'm on my way" 1243 is not registered at the phone book. The screen 1303 of FIG. 13 may include information indicating that the contact corresponding to "John" (or the other party) in the command "Text John that I'm on my way" 1243 is not registered at the phone book, and asking the user to add "John" as a contact, like a message "Hmm, seems like I can't find that contact. Let's check and add the contact here." 1320.

In an embodiment, after performing the action of identifying the error, the processor 160 may display a portion, "John" 1451, in a region 1410 that is a cause of the error in the command in which the error occurs, "Text John that I'm on my way" 1443, among the command "Tell me the weather in San Francisco" 1441 and the command "Text John that I'm on my way" 1443, to be distinguished from the other portion 1449, along with information 1480 indicating that the error occurred while executing the quick command function, as shown in FIG. 14. For example, the processor 160 may display the color of the portion that is the cause of the error in the command in which the error occurs to be different from the other portion through the display 140. However, the method of displaying the portion which is the cause of the error to be distinguished from the other portion is not limited to the method of displaying the color differently.

In an embodiment, the processor 160 may correct the command in which the error occurs (or the portion which is the cause of the error) based on a user input. For example, in response to a user input of selecting the portion that is the cause of the error (or region including the portion which is the cause of the error) in the command in which the error occurs by the user, the processor 160 may display, through the display 140, the screen 1501 including the command in which the error occurs, "Text John that I'm on my way" 1520, and the keyboard 1510, as shown on the screen 1501 of FIG. 15. In an embodiment, the portion which is the cause of the error, "John" 1521, may be displayed to be distinguished from the other portion of the command. For example, the shade of the display region of the portion which is the cause of the error, "John" 1521, may be different from the shade of the display region of the other portion in the command. In an embodiment, the processor 160 may correct the portion which is the cause of the error, "John" 1521, based on a user input using the keyboard 1510.

In an embodiment, when the portion in which the error occurs, "John," is corrected to "Jon" corresponding to a contact registered at the phone book, the processor 160 may display a command including the corrected portion "Jon" 1551, "Text Jon that I'm on my way" 1543, through the display 140, as shown on a screen 1502 of FIG. 15.

In an embodiment, the processor 160 may set the quick command function based on a user input on an object 1571 for setting the quick command function.

In an embodiment, when the portion that is the cause of the error is corrected and then the quick command function is set based on the user input, the processor 160 may store information regarding the set quick command function in the memory 150.

Figure 17:
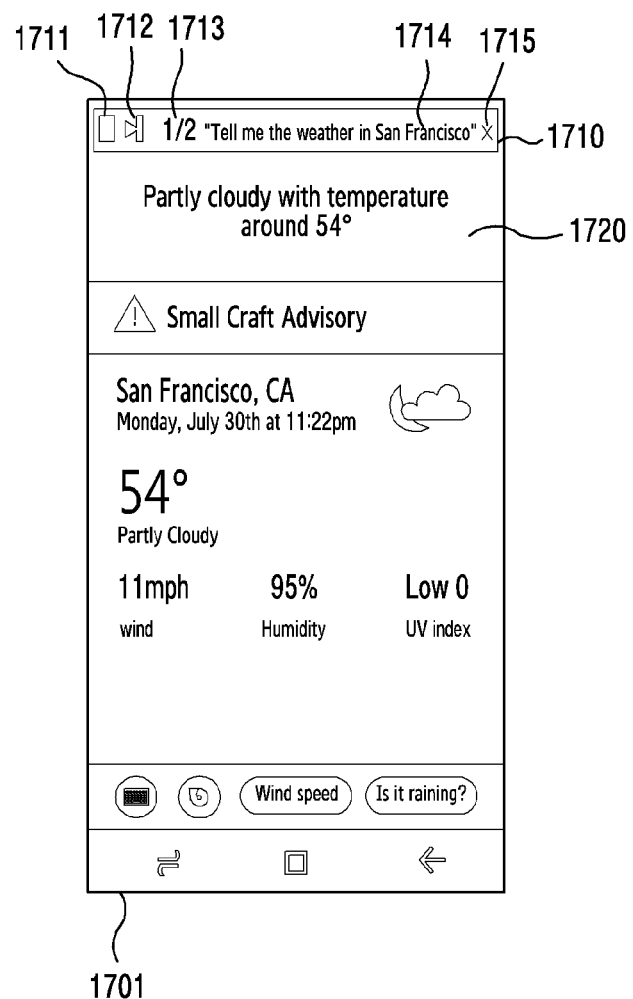
FIG. 17 is a view illustrating the method for controlling the action for executing the at least one function regarding the at least one command related to the shortcut instruction while executing the quick command function according to various embodiments.
Figure 21:
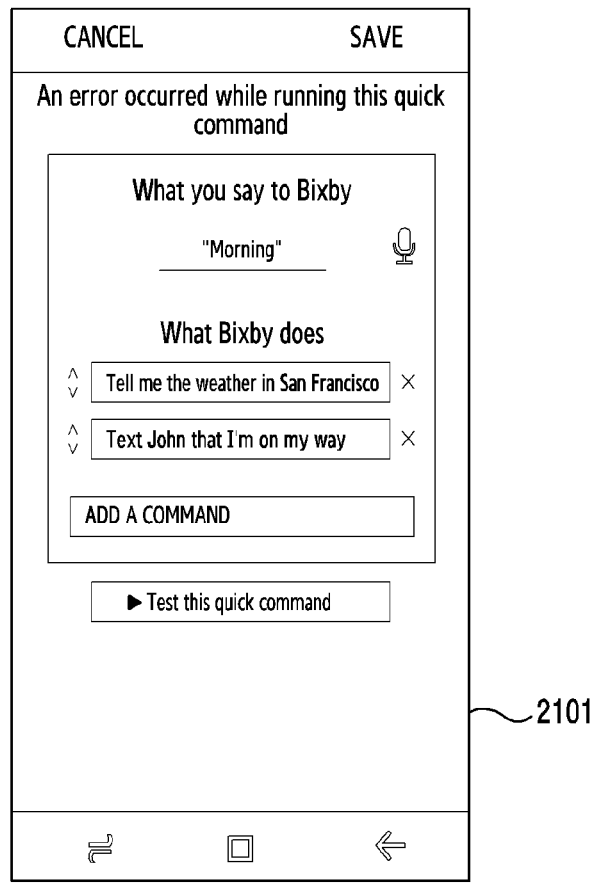
FIG. 21 is a view illustrating the method for controlling the action for executing the at least one function regarding the at least one command related to the shortcut instruction while executing the quick command function according to various embodiments.

FIG. 16 is a view illustrating a method for controlling an action for executing at least one function regarding at least one command related to a shortcut instruction while executing a quick command function according to various embodiments, FIG. 17 is a view illustrating the method for controlling the action for executing the at least one function regarding the at least one command related to the shortcut instruction while executing the quick command function according to various embodiments, FIG. 18 is a view illustrating the method for controlling the action for executing the at least one function regarding the at least one command related to the shortcut instruction while executing the quick command function according to various embodiments, FIG. 19 is a view illustrating the method for controlling the action for executing the at least one function regarding the at least one command related to the shortcut instruction while executing the quick command function according to various embodiments, FIG. 20 is a view illustrating the method for controlling the action for executing the at least one function regarding the at least one command related to the shortcut instruction while executing the quick command function according to various embodiments, and FIG. 21 is a view illustrating the method for controlling the action for executing the at least one function regarding the at least one command related to the shortcut instruction while executing the quick command function according to various embodiments.

In an embodiment, a voice input may be obtained from a user through the microphone 120. In an embodiment, the processor 160 may convert the voice input obtained from the user into a text by using the voice recognition module. The processor 160 may display the converted text through the display 140. For example, as shown in FIG. 16, the processor 160 may display the text converted from the voice input, "Morning" 1610, on a screen 1601 through the display 140. In the following embodiments, it is assumed that "Morning" 1610 corresponds to a shortcut instruction, and a plurality of commands related to the shortcut instruction are "Tell me the weather in San Francisco" and "Text John that I'm on my way."

In an embodiment, when it is identified that the voice input corresponds to the shortcut instruction, the processor 160 may perform at least one function executing action. In an embodiment, when a plurality of commands are related to the shortcut instruction, the processor 160 may execute a plurality of functions regarding the plurality of commands in sequence based on an order (or rank) set for the plurality of commands. For example, as shown in FIG. 17, the processor 160 may display, through the display 140, a screen 1701 (or an execution result screen) displaying execution of the function regarding the command "Tell me the weather in San Francisco" 1714 as shown in FIG. 17. The screen 1701 may include information 1720 regarding the weather of San Francisco as the function regarding the command "Tell me the weather in San Francisco" 1714.

In an embodiment, as shown in FIG. 17, the processor 160 may display a first object 1711 and a second object 1712 for controlling the at least one function executing action in a region 1710. The region 1710 may further include information 1713 indicating that the function regarding the command "Tell me the weather in San Francisco" 1714 is the first command of the two commands, the command "Tell me the weather in San Francisco" 1714, and an object 1715 for terminating the quick command function.

In an embodiment, the region 1710 may further include at least one of the various objects as shown in FIG. 18. In an embodiment, the objects 1801, 1803 of FIG. 18 may be objects for moving to pages on which results of the plurality of functions regarding the plurality of commands are displayed, respectively, when all of the plurality of functions regarding the plurality of commands related to the shortcut instruction are executed. In an embodiment, the objects 1805, 1807 of FIG. 18 may be objects for executing an action for executing a function of the first command or a function of the last command, while the plurality of functions regarding the plurality of commands related to the shortcut instruction are being executed. However, the objects included in the region 1710 are not limited to the first object 1711, the second object 1712, or the objects 1801-1807 of FIG. 18.

In an embodiment, the processor 160 may control the action for executing the at least one function in response to a user input on at least one object. For example, as shown in FIG. 19, in response to an input on the first object 1911 being received from the user while the function regarding the command "Text John that I'm on my way" 1914 is being performed, the processor 160 may temporarily stop the at least one function executing action. In an embodiment, even after execution of the function regarding the command "Text John that I'm on my way" 1914 is completed (for example, even after information 1920 indicating that the error occurs is displayed on the screen 1901), the processor 160 may temporarily stop the at least one function executing action in response to an input on the first object 1911 being received from the user.

In an embodiment, when the input on the first object 1911 is received from the user, the processor 160 may display, through the display 140, an object for displaying a screen for correcting (editing) the at least one command related to the shortcut instruction or correcting the error. For example, when the input on the first object 1911 is received from the user, the processor 160 may display, through the display 140, an object 2016 for displaying a screen (for example, a screen 2101 of FIG. 21) for correcting (or editing) the at least one command related to the shortcut instruction or correcting the error as shown in FIG. 20.

In an embodiment, in the state in which the at least one function executing action is temporarily stopped in response to the user input on the first object, when an input on the first object is received from the user, the processor 160 may resume the at least one function executing action. For example, in the state in which the at least one function executing action is temporarily stopped in response to the user input on the first object 1911 as shown in FIG. 19, when an input on the first object 2011 is received from the user as shown in FIG. 20, the processor 160 may resume the at least one function executing action.

In an embodiment, when an input on a second object 1912 is received from the user, the processor 160 may stop the action for executing the function regarding the currently performed command, and may perform an action for executing a function of the next command (or command of the next order) of the currently performed command. For example, when a plurality of commands are related to the shortcut instruction, and an input on the second object 1912 is received from the user while the action for executing the function regarding the first command among the plurality of commands is being performed, the processor 160 may not perform the action for executing the function regarding the first command, and may perform an action for executing the function of the second command (or may start performing the action for executing the function regarding the second command).

In an embodiment, in response to a user input on the object 2016 on the screen 2001 of FIG. 20, the processor 160 may display a screen 2101 for correcting (or editing) the at least one command related to the shortcut instruction or correcting the error through the display 140 as shown in FIG. 21. The screen 2101 of FIG. 21 is the same as the screen 1401 of FIG. 14 and thus a detailed description thereof is omitted. In an embodiment, when an input on a second object 2012 is received from the user, the processor 160 may stop the action for executing the function regarding the currently performed command.

By controlling an action for performing a function regarding a command set for a designated instruction by using at least one object while executing the at least one function regarding the at least one command set for the designated instruction, a voice recognition function can be more exactly executed.

An electronic device according to various embodiments of the disclosure may include a microphone, a display, and a processor, and the processor may be configured to: obtain a voice input through the microphone; identify whether the voice input corresponds to an instruction that is set to execute at least one function regarding at least one command; in response to it being identified that the voice input corresponds to the set instruction, perform an action for executing the at least one function; through the display, display at least one object for controlling the action for executing the at least one function; and, in response to a user input on the at least one object, control the action for executing the at least one function.

In various embodiments, the at least one object may include a first object, and the processor may be configured to temporarily stop the action for executing the at least one function in response a user input on the first object.

In various embodiments, the processor may be configured to: in response to a user input on the first object, display a second object through the display; and, in response to a user input on the second object, display a screen for correcting the at least one command through the display.

In various embodiments, the at least one object may include a third object, and the processor may be configured to, when the at least one command includes a first command and a second command, in response to a user input on the third object being received while executing an action for executing a function regarding the first command, skip the action for executing the function regarding the first command, and perform an action for executing a function regarding the second command.

In various embodiments, the processor may be configured to obtain the set instruction and the at least one command by using at least one of the microphone or a keyboard in order to set the set instruction and the at least one command.

In various embodiments, the processor may be configured to further obtain the at least one command by selecting at least one of a command related to an application or service provided by a voice recognition application, or a previously executed command.

In various embodiments, the processor may be configured to: highlight a correctable portion in the at least one command through the display; and, based on a user input, correct the correctable portion.

In various embodiments, wherein the processor may be configured to: while setting the set instruction and the at least one command, or while executing the action for executing the at least one function, receive a user input on a fourth object; and, in response to the user input on the fourth object, identify whether the action for executing the at least one function is executable.

In various embodiments, the processor may be configured to, when it is identified that the action for executing the at least one function is not executable, highlight a portion that causes the action for executing the at least one function not to be executed in the at least one command.

In various embodiments, the processor may be configured to display, through the display, the at least one object not to overlap information indicating a result of executing the at least one function.

A method according to various embodiments of the disclosure may include: obtaining a voice input through a microphone; identifying whether the voice input corresponds to an instruction that is set to execute at least one function regarding at least one command; in response to it being identified that the voice input corresponds to the set instruction, performing an action for executing the at least one function; through a display, displaying at least one object for controlling the action for executing the at least one function; and, in response to a user input on the at least one object, controlling the action for executing the at least one function.

In various embodiments, wherein the at least one object may include a first object, and controlling may include temporarily stopping the action for executing the at least one function in response a user input on the first object.

In various embodiments, the method may further include: in response to a user input on the first object, displaying a second object through the display; and, in response to a user input on the second object, displaying a screen for correcting the at least one command through the display.

In various embodiments, the at least one object may include a third object, and controlling may include, when the at least one command includes a first command and a second command, in response to a user input on the third object being received while executing an action for executing a function regarding the first command, skipping the action for executing the function regarding the first command, and performing an action for executing a function regarding the second command.

In various embodiments, the method may further include obtaining the set instruction and the at least one command by using at least one of the microphone or a keyboard in order to set the set instruction and the at least one command.

In various embodiments, obtaining the set instruction and the at least one command may include further obtaining the at least one command by selecting at least one of a command related to an application or service provided by a voice recognition application, or a previously executed command.

In various embodiments, the method may further include: highlighting a correctable portion in the at least one command through the display; and, based on a user input, correcting the correctable portion.

In various embodiments, the method may further include: while setting the set instruction and the at least one command, or while executing the action for executing the at least one function, receiving a user input on a fourth object; and, in response to the user input on the fourth object, identifying whether the action for executing the at least one function is executable.

In various embodiments, the method may further include, when it is identified that the action for executing the at least one function is not executable, highlighting a portion that causes the action for executing the at least one function not to be executed in the at least one command.

In addition, the structure of data used in the above-described embodiments of the disclosure may be recorded on a computer readable recording medium through various means. The computer readable recording medium may include a storage medium such as a magnetic storage medium (for example, a read only memory (ROM), a floppy disk, a hard disk, or the like) and an optical reading medium (for example, a CD-ROM, a DVD, or the like).

In an embodiment, a computer-readable recording medium on which programs executable by a computer are recorded may record a program for executing the operations of: obtaining a voice input through a microphone; identifying whether the voice input corresponds to an instruction that is set to execute at least one function regarding at least one command; in response to it being identified that the voice input corresponds to the set instruction, performing an action for executing the at least one function; through a display, displaying at least one object for controlling the action for executing the at least one function; and, in response to a user input on the at least one object, controlling the action for executing the at least one function.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a microphone;
a display; and
a processor operably coupled to a memory and configured to:
obtain a voice input through the microphone;
convert the obtained voice input from a voice form into a text form;
identify whether the converted voice input corresponds to a shortcut instruction that is stored in the memory and is set to execute at least one function regarding each of at least two commands that are mapped to the shortcut instruction stored in the memory, the at least two commands comprising a first command and a second command, wherein the shortcut instruction is set to execute a function regarding the first command, followed by a function regarding the second command in sequence;
in response to identifying that the converted voice input does not correspond to any shortcut instruction that is stored in the memory, execute a normal voice command function regarding a command that is the converted voice input;
in response to identifying that the converted voice input corresponds to the shortcut instruction, execute the function regarding the first command;
through the display, display at least one object for controlling an action for or a state of executing the at least one function regarding each of the at least two commands, while executing the at least one function regarding each of the at least two commands, wherein the at least one object comprises a first object and a second object; and
in response to receiving a user input on the at least one object, control the action for or the state of executing the at least one function regarding each of the at least two commands, by:
in response to receiving a user input on the first object, temporarily stopping executing the at least one function regarding each of the at least two commands, and
in response to receiving a user input on the second object while executing the function regarding the first command, skipping executing the function regarding the first command and executing the function regarding the second command.

2. The electronic device of claim 1, wherein the processor is configured to:
in response to receiving the user input on the first object, display a third object through the display; and
in response to receiving a user input on the third object, display a screen for correcting the at least two commands through the display.

3. The electronic device of claim 1, wherein the processor is configured to obtain the shortcut instruction and the at least two commands by using at least one of the microphone or a keyboard in order to set the shortcut instruction and the at least two commands.

4. The electronic device of claim 3, wherein the processor is configured to further obtain the at least two commands by selecting at least one of (i) a command related to an application or service provided by a voice recognition application or (ii) a previously executed command.

5. The electronic device of claim 4, wherein the processor is configured to:
  highlight a correctable portion in the at least two commands through the display; and
  based on receiving a user input, correct the correctable portion.

6. The electronic device of claim 3, wherein the processor is configured to:
  while (i) setting the shortcut instruction and the at least two commands or (ii) executing the at least one function, receive a user input on a fourth object; and
  in response to receiving the user input on the fourth object, identify whether the at least one function is executable.

7. The electronic device of claim 6, wherein the processor is configured to, based on identifying that the at least one function is not executable, highlight a portion that causes the at least one function to be not executable in the at least two commands.

8. The electronic device of claim 1, wherein the processor is configured to display, through the display, the at least one object not to overlap information indicating a result of executing the at least one function.

9. The electronic device of claim 1, wherein:
  the memory stores one or more shortcut instructions including the shortcut instruction and a second shortcut instruction that is set to execute a second at least one function regarding each of a second at least two commands;
  the second at least two commands are mapped to the second shortcut instruction and comprises a third command and a fourth command;
  wherein the second shortcut instruction is set to execute a function regarding the third command, followed by a function regarding the fourth command in sequence.

10. The electronic device of claim 9, wherein to identify whether the converted voice input corresponds to the shortcut instruction, the processor is configured to:
  determine whether the text from the converted voice input matches any from among the one or more shortcut instructions;
  in response to a determination that the text from the converted voice input matches the shortcut instruction, identify that the converted voice input corresponds to the shortcut instruction;
  in response to a determination that the text from the converted voice input matches the second shortcut instruction, identify that the converted voice input corresponds to the second shortcut instruction and execute the function regarding the third command.

11. The electronic device of claim 10, wherein, the processor is configured to:
  in response to a determination that the text from the converted voice input matches a third shortcut instruction that is set to execute a function regarding a fifth command mapped to the third shortcut instruction, identify that the converted voice input corresponds to the third shortcut instruction and execute the function regarding the fifth command.

12. A method comprising:
  obtaining a voice input through a microphone;
  converting the obtained voice input from a voice form into a text form;
  identifying whether the converted voice input corresponds to a shortcut instruction that is stored in a memory and is set to execute at least one function regarding each of at least two commands that are mapped to the shortcut instruction stored in the memory, the at least two commands comprising a first command and a second command, wherein the shortcut instruction is set to execute a function regarding the first command, followed by a function regarding the second command in sequence;
  in response to identifying that the converted voice input does not correspond to any shortcut instruction that is stored in the memory, executing a normal voice command function regarding a command that is the converted voice input;
  in response to identifying that the converted voice input corresponds to the shortcut instruction, executing the function regarding the first command;
  through a display, displaying at least one object for controlling an action for or a state of executing the at least one function regarding each of the at least two commands, while executing the at least one function regarding each of the at least two commands, wherein the at least one object comprises a first object and a second object; and
  in response to a user input on the at least one object, controlling the action for or the state of executing the at least one function regarding each of the at least two commands, by:
    in response to receiving a user input on the first object, temporarily stopping executing the at least one function regarding each of the at least two commands, and
    in response to receiving a user input on the second object while executing the function regarding the first command, skipping executing the function regarding the first command and executing the function regarding the second command.

13. The method of claim 12, further comprising:
  in response to receiving the user input on the first object, displaying a third object through the display; and
  in response to receiving a user input on the third object, displaying a screen for correcting the at least two commands through the display.

14. The method of claim 12, further comprising obtaining the shortcut instruction and the at least two commands by using at least one of the microphone or a keyboard in order to set the shortcut instruction and the at least two commands.

15. The method of claim 14, wherein obtaining the shortcut instruction and the at least two commands comprises further obtaining the at least two commands by selecting at least one of (i) a command related to an application or service provided by a voice recognition application or (ii) a previously executed command.

16. The method of claim 15, further comprising:
  highlighting a correctable portion in the at least two commands through the display; and
  based on receiving a user input, correcting the correctable portion.

17. The method of claim 14, further comprising:
  while (i) setting the shortcut instruction and the at least two commands or (ii) executing the at least one function, receiving a user input on a fourth object; and
  in response to receiving the user input on the fourth object, identifying whether the at least one function is executable.

18. The method of claim 17, further comprising, based on identifying that the at least one function is not executable, highlighting a portion that causes the at least one function to be not executable in the at least two commands.

19. A computer-readable recording medium storing instructions that, when executed by a processor, cause the processor to:

obtain a voice input through a microphone;

convert the obtained voice input from a voice form into a text form;

identify whether the converted voice input corresponds to a shortcut instruction that is stored in a memory and is set to execute at least one function regarding each of at least two commands that are mapped to the shortcut instruction stored in the memory, the at least two commands comprising a first command and a second command, wherein the shortcut instruction is set to execute a function regarding the first command, followed by a function regarding the second command in sequence;

in response to identifying that the converted voice input does not correspond to any shortcut instruction that is stored in the memory, execute a normal voice command function regarding a command that is the converted voice input;

in response to identifying that the converted voice input corresponds to the shortcut instruction, execute the function regarding the first command;

through a display, display at least one object for controlling an action for or a state of executing the at least one function regarding each of the at least two commands, while executing the at least one function regarding each of the at least two commands, wherein the at least one object comprises a first object and a second object; and in response to receiving a user input on the at least one object, control the action for or a state of executing the at least one function regarding each of the at least two commands, by:

in response to receiving a user input on the first object, temporarily stopping executing the at least one function regarding each of the at least two commands, and in response to receiving a user input on the second object while executing the function regarding the first command, skipping executing the function regarding the first command and execute the function regarding the second command.

\* \* \* \* \*